United States Patent
Kawamoto et al.

(10) Patent No.: US 8,779,015 B2
(45) Date of Patent: Jul. 15, 2014

(54) METHOD FOR RECYCLING OF PHENOLIC ANTIOXIDANT AGENT, PROCESS FOR PRODUCTION OF OLEFIN POLYMER, POLYOLEFIN POWDER, AND FIBERS

(75) Inventors: Naoshi Kawamoto, Saitama (JP); Tsuyoshi Urushihara, Saitama (JP); Kohei Okamoto, Saitama (JP); Tetsuya Seguchi, Saitama (JP)

(73) Assignee: Adeka Corporation, Tokyo (JP)

( * ) Notice: Subject to any disclaimer, the term of this patent is extended or adjusted under 35 U.S.C. 154(b) by 80 days.

(21) Appl. No.: 13/391,078

(22) PCT Filed: Sep. 1, 2010

(86) PCT No.: PCT/JP2010/064954
§ 371 (c)(1),
(2), (4) Date: Mar. 1, 2012

(87) PCT Pub. No.: WO2011/027793
PCT Pub. Date: Mar. 10, 2011

(65) Prior Publication Data
US 2012/0149838 A1   Jun. 14, 2012

(30) Foreign Application Priority Data

Sep. 4, 2009 (JP) .................. 2009-204699
Sep. 4, 2009 (JP) .................. 2009-204700
Sep. 4, 2009 (JP) .................. 2009-204701
Sep. 30, 2009 (JP) .................. 2009-228981

(51) Int. Cl.
*C08J 11/04* (2006.01)

(52) U.S. Cl.
USPC ............. 521/40.5; 521/40; 521/45; 526/69; 526/72; 526/89; 526/215; 528/480; 528/483; 528/499; 564/123; 564/161; 564/170

(58) Field of Classification Search
USPC ........... 521/40, 40.5, 45; 528/480, 483, 499; 564/123, 161, 170; 526/67, 68, 69, 70, 526/72, 89, 213, 215
See application file for complete search history.

(56) References Cited

U.S. PATENT DOCUMENTS

2008/0214752 A1* 9/2008 Tobita et al. .................. 526/90

FOREIGN PATENT DOCUMENTS

| EP | 0 254 348 B1 | 8/1993 |
|----|---|---|
| JP | 57-003842 | 1/1982 |
| JP | 63-092613 A | 4/1988 |
| JP | 05-271335 | 10/1993 |
| JP | 10-183423 A | 7/1998 |
| JP | 2005-206625 A | 8/2005 |
| JP | 2005-255953 A | 9/2005 |
| JP | 2006-52241 A | 2/2006 |
| JP | 2006-282985 A | 10/2006 |
| WO | WO 2006/095667 * | 9/2006 |

OTHER PUBLICATIONS

Machine translation of JP 2006-052241. Hida et al, Feb. 2006.*
Machine translation fo JP 2005-206625, Hida et al, Aug. 2005.*
International Search Report issued in PCT/JP2010/064954, dated Sep. 28, 2010.

* cited by examiner

*Primary Examiner* — Frances Tischler
(74) *Attorney, Agent, or Firm* — Birch, Stewart, Kolasch & Birch, LLP

(57) ABSTRACT

Provided are a recycling method for industrially, simply and effectively recycling a phenolic body from a phenolic antioxidant which is masked by an organoaluminum compound and contained in an olefin polymer obtained by supplying the masked phenolic antioxidant upon polymerization; and an olefin polymer obtained by this method.

In a method for recycling a phenolic antioxidant wherein a phenolic antioxidant which is masked by an organoaluminum compound and contained in an olefin polymer obtained by supplying the masked phenolic antioxidant upon polymerization is recycled to a phenolic body, a nitrogen gas comprising water and/or a proton donor at a volume ratio of $1.0 \times 10^{-6}$ to $2.5 \times 10^{-2}$ with respect to 1 volume of nitrogen is brought into contact with the olefin polymer.

6 Claims, No Drawings

METHOD FOR RECYCLING OF PHENOLIC ANTIOXIDANT AGENT, PROCESS FOR PRODUCTION OF OLEFIN POLYMER, POLYOLEFIN POWDER, AND FIBERS

TECHNICAL FIELD

The present invention relates to a method for recycling a phenolic antioxidant used for stabilization of macromolecular materials, and an olefin polymer, more particularly, a method for industrially, simply and effectively recycling a phenolic body from a phenolic antioxidant which is masked by an organoaluminum compound and contained in an olefin polymer obtained by supplying the masked phenolic antioxidant upon polymerization; and an olefin polymer obtained by this method.

Further, the present invention relates to a method for producing an olefin polymer, more particularly, a method for producing a stabilized olefin polymer, wherein a phenolic antioxidant masked by an organoaluminum compound is supplied upon polymerization when olefin monomers are polymerized, which method enables to industrially, simply and effectively recycle the phenolic antioxidant which is masked by the organoaluminum and contained in the olefin polymer to a phenolic body.

Further, the present invention relates to a method for producing a stabilized olefin polymer, more particularly, a method for producing a stabilized olefin polymer wherein fluidity of an additive is improved, the concentration of a slurry additive is less likely to become uneven with time, and the quality of the polymer is constant.

Still further, the present invention relates to a polyolefin powder and a fiber obtained using it, more particularly, a polyolefin powder with which a polyolefin fiber having good thermal stability and excellent NOx gas resistance can be provided, and a fiber obtained using it.

BACKGROUND ART

As a method wherein a stabilizer is added before polymerization or during polymerization of olefins, Patent Document 1 proposes a method wherein olefin monomers are polymerized in the presence of a phenolic antioxidant. A method wherein a phenolic antioxidant is added before the polymerization or during the polymerization has the advantage of being able to omit a step of blending of the stabilizer by melt-kneading such as extruding after the polymerization, but it has been suggested that phenolic antioxidants having an ester bond such as tetrakis(3-(3,5-di-tert-butyl-4-hydroxyphenyl)propionyloxymethyl)methane have problems in that the catalytic activity of a polymerization catalyst may decreased; the interaction between a stabilizer and a metal in a polymerization catalyst may cause coloring of olefins; and the like, so that selection and control of polymerization conditions are laborious, which is problematic.

The present inventors reported in Patent Document 2, Patent Document 3 and Patent Document 4 that masking of a specific phenolic antioxidant by an organoaluminum compound can solve the above-described problems. However, although a phenolic antioxidant masked by an organoaluminum compound suppresses adverse effects on a polymerization catalyst, the effect of the action of the phenolic antioxidant as a stabilizer cannot be obtained in cases where the masked phenolic antioxidant is used as it is, so that a step of recycling of the masked phenolic antioxidant to a phenolic body is required after polymerization of olefin monomers.

In Patent Documents 2 to 4, methods wherein a phenolic antioxidant is recycled by an alcohol, water or water vapor employed in a step of removal of the polymerization catalyst residue after completion of a polymerization step are proposed. Actually, by sufficiently carrying out the polymerization catalyst deactivation treatment after completion of batch polymerization with an alcohol, water or water vapor, a masked phenolic antioxidant can be recycled to a phenolic body and a sufficient stabilization effect can therefore be achieved.

Further, a method for producing a fiber by the melt-blown method using a polyester polymer is known. The melt-blown method is a method wherein a molten resin is extruded to form a small resin flow, which is then brought into contact with a high-speed heated gas to be made into a discontinuous fiber having a small fiber diameter, followed by accumulating this fiber on a porous support, to obtain a fiber. By using the melt-blown method, productivity of polyester resin fibers has been improved. Use of the melt-blown method is being studied also for other various materials, and its use has been attempted also for polyolefins.

Polyolefins have a problem in that they have poor stability to heat and light and hence are easily oxidized/deteriorated when the polyolefins are processed at a high temperature and when they are exposed to heat and/or light during their use, resulting in insufficient service lives as plastic products. Thus, in general, in order to prevent oxidation/deterioration, a stabilizer(s) such as a phenolic antioxidant, phosphorus-containing antioxidant, sulfur-containing antioxidant, hydroxylamine compound, hindered amine compound, ultraviolet absorber and/or acid scavenger is/are added. Selection, blending and the like of various stabilizers depending on the intended use are being studied to realize their practical uses.

In cases where a stabilizer is blended in a polyolefin, a method wherein the polyolefin and the stabilizer are mixed together and granulation is then carried out using an extrusion apparatus or the like is generally employed, and, for example, Patent Document 5 and Patent Document 6 propose polyolefin resin compositions prepared by inclusion of a 1,3,5-tris-(4-t-butyl-3-hydroxy-2,6-dimethylbenzyl)isocyanurate phenolic antioxidant and a phosphorus-containing antioxidant in a polyolefin resin.

However, in cases where a fiber is to be obtained by the melt-blown method, there is a problem in that, since the polyolefin employed has extremely high fluidity (in some cases, a melt flow rate of 200 to 600 g/10 min.), granulation is impossible with a usual extrusion apparatus.

As a method for stabilizing a polyolefin wherein a granulation step using an extrusion apparatus is not employed, methods wherein a stabilizer is added before polymerization or after polymerization of olefin monomers have been studied. For example, in Patent Document 7, a production method wherein α-olefins are polymerized in the presence of a phosphorus-containing antioxidant is shown. It is shown that, when compared to polyolefins produced by mixing an antioxidant with a polymer obtained by polymerization of α-olefins without using a phosphorus-containing antioxidant, polyolefins produced by polymerizing α-olefins in the presence of a phosphorus-containing antioxidant have more excellent stabilization effects.

Although a method wherein a stabilizer is added before polymerization or after polymerization of olefin monomers has the advantage of being able to omit a step of blending of the stabilizer by melt-kneading such as extruding after the polymerization, the method has problems in that the catalytic activity of a polymerization catalyst may be decreased; the interaction between a stabilizer and a catalyst metal may cause coloring of the polyolefin resin; and the like, so that selection and control of polymerization conditions are laborious, which is problematic.

Examples of particular influences of the stabilizer on the polymerization catalyst include, as suggested in Patent Document 1, lowering of the catalytic activities of polymerization catalysts by phenolic antioxidants having an ester bond, such as tetrakis[3-(3,5-di-tert-butyl-4-hydroxyphenyl)propionyloxymethyl]methane, which are stabilizers widely used for polyolefins. Thus, it has been shown that such phenolic antioxidants are not suitable for being added before the polymerization.

As methods for avoiding such influences on polymerization catalysts, Patent Document 3 and Patent Document 4 describe methods wherein a phenolic antioxidant masked by an organoaluminum compound is added before polymerization or during polymerization of monomers having an ethylenically unsaturated bond, to produce a stabilized polymer.

RELATED ART DOCUMENTS

Patent Documents

Patent Document 1: Japanese Unexamined Patent Application Publication No. 5-271335
Patent Document 2: Japanese Unexamined Patent Application Publication No. 2005-255953
Patent Document 3: Japanese Unexamined Patent Application Publication No. 2006-052241
Patent Document 4: Japanese Unexamined Patent Application Publication No. 2006-282985
Patent Document 5: Japanese Unexamined Patent Application Publication No. 10-183423
Patent Document 6: Japanese Unexamined Patent Application Publication No. 57-3842
Patent Document 7: Japanese Unexamined Patent Application Publication No. 63-92613

SUMMARY OF THE INVENTION

Problems to be Solved by the Invention

In cases where the stabilization methods of the above Patent Documents are to be applied to gas-phase polymerization or bulk polymerization, a phenolic antioxidant masked by an organoaluminum is preliminarily prepared and added to a catalyst, followed by supplying the resulting mixture to a polymerization apparatus. Since, as a result, a step of handling of an organoaluminum compound, whose contacting with oxygen or moisture should be avoided, is added to a conventional polymerization method, the operation is laborious, and safety of the operation and maintenance of stability of the polymerization activity must be taken into consideration, which prevent the methods from being industrially used.

Further, although a phenolic antioxidant itself has poor fluidity and hence needs to be slurried with a solvent, diffusibility of a phenolic antioxidant in a solution is poor and therefore the phenolic antioxidant precipitates with time to cause unevenness of its concentration. Therefore, the stabilization effect of an olefin polymer polymerized by batch polymerization is not constant, which is problematic.

On the other hand, since, in the cases of continuous polymerization, the length of time for deactivation of the polymerization catalyst is shorter than in the cases of batch polymerization, the phenolic antioxidant cannot be sufficiently recycled and hence a sufficient stabilization effect cannot be obtained. Further, although a method wherein the polymerization catalyst is decomposed in a water treatment step is preferred in view of securing recycling of the phenolic antioxidant if the water treatment is extensively carried out, increase in the amount of water for the treatment leads to increase in the water content of the olefin polymer, and molding of an olefin polymer having a high water content may cause problems such as decrease in transparency of the molded product and generation of air bubbles in the molded product. Further, a larger-scale water treatment step leads to increase in the energy required for separation of the olefin polymer from water and for a drying step, which is industrially disadvantageous.

In addition, by virtue of the recent progress of catalytic technologies and polymerization process technologies, the steps of catalyst deactivation and removal of catalyst residues have been largely simplified, and hence a process requiring no tank for treatment of catalyst deactivation and removal of the catalyst residues is becoming common. Thus, development of a method by which a phenolic antioxidant can be effectively recycled while equipment investment for another process and increase in the processing time can be avoided has been necessary.

Although the above Patent Documents describe Examples of batch methods in a laboratory scale, no method for solving the above-described problems is described therein, and these literatures do not even disclose the existence of the above-described problems.

Further, none of the above-described literatures studied application of the methods to fibers. Further, during heating (hot air) treatment in the production process of a polyolefin fiber, the fiber is sometimes exposed to hot air containing a NOx gas, and in this case, the fiber turns yellow due to the influence of the NOx gas and the outer appearance of the polyolefin fiber is degraded, which is problematic.

Thus, the present invention aims to provide a recycling method for industrially, simply and effectively recycling a phenolic body from a phenolic antioxidant which is masked by an organoaluminum compound and contained in an olefin polymer obtained by supplying the masked phenolic antioxidant upon polymerization; and an olefin polymer obtained by this method.

Another object of the present invention is to provide a method for producing a stabilized olefin polymer, wherein a phenolic antioxidant masked by an organoaluminum compound is supplied upon polymerization when olefin monomers are polymerized, which method enables to industrially, simply and effectively recycle the phenolic antioxidant which is masked by the organoaluminum and contained in the olefin polymer to a phenolic body.

Still another object of the present invention is to provide a method for producing a stabilized olefin polymer having a constant quality, wherein the problem of poor fluidity and precipitation of an additive is avoided and hence the heterogeneity of the concentration of the additive which occurs with time is small.

Still another object of the present invention is to provide a polyolefin powder with which a sufficiently stabilized polyolefin fiber can be provided while the influence of a NOx gas during the production process is suppressed, and a polyolefin fiber produced using the polyolefin powder.

Means for Solving the Problems

The present inventors intensively studied to solve the above problems and discovered that bringing an olefin polymer obtained by supplying upon polymerization a phenolic antioxidant masked by an organoaluminum compound into contact with a nitrogen gas containing water and/or a proton donor at a specific ratio enables effective recycling of the phenolic antioxidant masked by an organoaluminum compound and contained in the olefin polymer into a phenolic body.

Further, the present inventors discovered that, when olefin monomers are polymerized by supplying a phenolic antioxidant masked by an organoaluminum compound, the above problems can be solved by applying steam, or a nitrogen gas containing moisture to the olefin polymer.

Further, the present inventors discovered that the above problems can be solved by inclusion, upon polymerization of olefin monomers, of a step wherein a slurry additive(s) is/are pumped while being mixed with a promoter component(s) in a pipe(s), followed by transferring the resulting mixture to a polymerization tank.

Still further, the present inventors discovered that the above objects can be achieved by polymerizing olefin monomers with addition of a specific phenolic antioxidant masked by an organoaluminum compound, and a phosphorus-containing antioxidant before the polymerization or during the polymerization of olefin monomers, thereby completing the present invention.

That is, the method of the present invention is a method for recycling a phenolic antioxidant, wherein a phenolic antioxidant represented by the General Formula (1) below:

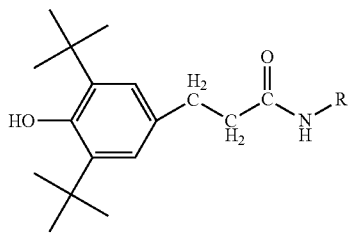

(1)

(wherein R represents $C_{12}$-$C_{24}$ alkyl which is optionally branched, $C_3$-$C_{12}$ cycloalkyl which is optionally substituted, or $C_6$-$C_{18}$ aryl which optionally has a substituent(s)) which is masked by an organoaluminum compound and contained in an olefin polymer obtained by supplying the masked phenolic antioxidant upon polymerization is recycled to a phenolic body, wherein a nitrogen gas comprising water and/or a proton donor at a volume ratio of $1.0 \times 10^{-6}$ to $2.5 \times 10^{-2}$ with respect to 1 volume of nitrogen is brought into contact with the olefin polymer.

Further, the method of the present invention is a method for producing an olefin polymer, wherein a phenolic antioxidant represented by the General Formula (1) below:

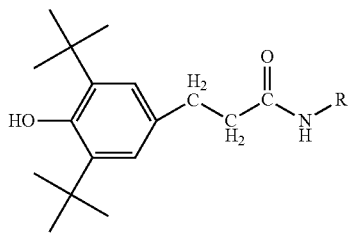

(1)

(wherein R represents $C_{12}$-$C_{24}$ alkyl which is optionally branched, $C_3$-$C_{12}$ cycloalkyl which is optionally substituted, or $C_6$-$C_{18}$ aryl which optionally has a substituent(s)) which is masked by an organoaluminum compound is supplied upon polymerization when olefin monomers are polymerized, wherein steam, or a nitrogen gas comprising moisture is injected into an extruder when the obtained olefin polymer is melt-kneaded in the extruder.

Further, the method of the present invention is a method for producing a stabilized olefin polymer, wherein an additive(s) and a promoter component(s) are supplied to olefin monomers upon polymerization of the olefin monomers, wherein the method comprises a step wherein a slurry additive(s) is/are pumped while being mixed with a promoter component(s) in a pipe(s), followed by transferring the resulting mixture to a polymerization tank for olefin monomers.

Further, the polyolefin powder of the present invention is a polyolefin powder composed of a polyolefin resin composition obtained by polymerizing olefin monomers, which polyolefin powder is produced by adding 0.001 to 0.5 part by mass of a phenolic antioxidant represented by the General Formula (2) below:

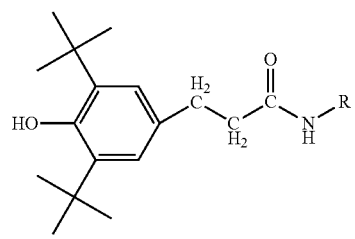

(2)

(wherein R represents $C_1$-$C_{30}$ alkyl which is optionally branched, $C_3$-$C_{12}$ cycloalkyl which is optionally substituted, or $C_6$-$C_{18}$ aryl which optionally has a substituent(s)) masked by an organoaluminum compound and 0.001 to 0.5 part by mass of a phosphorus-containing antioxidant with respect to 100 parts by mass of olefin monomers to a catalytic system or a polymerization system before polymerization or during polymerization of the olefin monomers.

Further, the fiber of the present invention is a fiber obtained by using the above-described polyolefin powder.

Effect of the Invention

By the present invention, a phenolic body can be industrially, simply and effectively recycled from a phenolic antioxidant which is masked by an organoaluminum compound and contained in an olefin polymer obtained by supplying the masked phenolic antioxidant upon polymerization.

Further, by the present invention, when olefin monomers are polymerized by supplying upon polymerization a phenolic antioxidant masked by an organoaluminum compound, the phenolic antioxidant which is masked by an organoaluminum compound and contained in the olefin polymer can be industrially, simply and effectively recycled into a phenolic body, and a stabilized olefin polymer can be produced.

Further, by the present invention, a method for producing a stabilized olefin polymer having a constant quality, wherein the problem of poor fluidity and precipitation of an additive is avoided and hence the heterogeneity of the concentration of the additive which occurs with time is small, can be provided.

Further, by the present invention, a polyolefin powder with which a sufficiently stabilized polyolefin fiber can be provided while the influence of a NOx gas during the production process is suppressed, and a polyolefin fiber produced using the polyolefin powder can be provided.

BEST MODE FOR CARRYING OUT THE INVENTION

The modes of the present invention will now be described more particularly.

The phenolic antioxidant to be used in the present invention is not restricted as long as the phenolic antioxidant is not decomposed by masking treatment with an organoaluminum compound, and examples of the phenolic antioxidant include amide compounds of 3-(3,5-dialkyl-4-hydroxyphenyl)propionate such as stearyl-3-(3,5-di-tert-butyl-4-hydroxyphenyl) propionamide, palmityl-3-(3,5-di-tert-butyl-4-hydroxyphenyl)propionamide, myristyl-3-(3,5-di-tert-butyl-4-hydroxyphenyl)propionamide and lauryl-3-(3,5-di-tert-butyl-4-hydroxyphenyl)propionamide; and 1,3,5-trimethyl-2,4,6-tris(3,5-di-tert-butyl-4-hydroxybenzyl)benzene.

Among the above phenolic antioxidants, compounds represented by the General Formula (1) below:

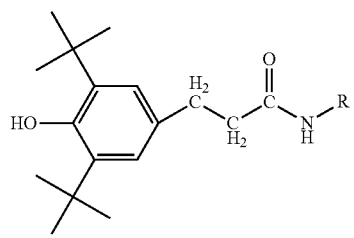

(1)

(wherein R represents $C_1$-$C_{30}$ alkyl which is optionally branched, $C_3$-$C_{12}$ cycloalkyl which is optionally substituted, or $C_6$-$C_{18}$ aryl which optionally has a substituent(s)), such as stearyl-3-(3,5-di-tert-butyl-4-hydroxyphenyl)propionamide, palmityl-3-(3,5-di-tert-butyl-4-hydroxyphenyl)propionamide, myristyl-3-(3,5-di-tert-butyl-4-hydroxyphenyl)propionamide and lauryl-3-(3,5-di-tert-butyl-4-hydroxyphenyl) propionamide, are especially preferred since these are excellent in the effect of stabilization of olefin polymers and color tone.

Examples of the $C_1$-$C_{30}$ alkyl which is optionally branched, represented by R in the General Formula (1), include methyl, ethyl, propyl, isopropyl, butyl, sec-butyl, tert-butyl, isobutyl, pentyl, isopentyl, tert-pentyl, hexyl, heptyl, n-octyl, isooctyl, tert-octyl, nonyl, isononyl, decyl, undecyl, dodecyl, tridecyl, tetradecyl, pentadecyl, hexadecyl, heptadecyl and octadecyl, and, in the present invention, those having a number of carbon atoms of 12 to 24 are especially preferred. A phenolic antioxidant whose alkyl has less than 12 carbon atoms may be likely to evaporate, while in cases where the alkyl has more than 24 carbon atoms, the ratio of phenol with respect to the molecular weight of the phenolic antioxidant is small and hence the stabilization effect may be decreased.

These alkyl groups may be interrupted by an oxygen atom(s) and/or sulfur atom(s), and/or an aryl group(s) described below, and/or a hydrogen atom(s) in the alkyl groups may be substituted by a chain aliphatic group(s) such as hydroxy, cyano, alkenyl and/or alkenyloxy; a cyclic aliphatic group(s) such as pyrrole, furan, thiophene, imidazole, oxazole, thiazole, pyrazole, isoxazole, isothiazole, pyridine, pyridazine, pyrimidine, pyrazine, piperidine, piperazine, morpholine, 2H-pyran, 4H-pyran, phenyl, biphenyl, triphenyl, naphthalene, anthracene, pyrrolidine, pyrindine, indolizine, indole, isoindole, indazole, purine, quinolizine, quinoline, isoquinoline and/or cycloalkyl; and/or an aromatic group(s). Further, two or more of these interruptions and/or substitutions may be combined.

Examples of the $C_3$-$C_{12}$ cycloalkyl which is optionally substituted, represented by R in the General Formula (1), include cyclopropyl, cyclopentyl, cyclohexyl, cycloheptyl, cyclooctyl, cyclononyl and cyclodecyl, and a hydrogen atom(s) in the cycloalkyl may be substituted by alkyl, alkenyl, alkenyloxy, hydroxy and/or cyano, which alkyl may be interrupted by an oxygen atom(s) and/or a sulfur atom(s).

Examples of the $C_6$-$C_{18}$ aryl which optionally has a substituent(s), represented by R in the General Formula (1), include phenyl, methylphenyl, butylphenyl, octylphenyl, 4-hydroxyphenyl, 3,4,5-trimethoxyphenyl, 4-tert-butylphenyl, biphenyl, naphthyl, methylnaphthyl, anthracenyl, phenanthryl, benzyl, phenylethyl and 1-phenyl-1-methylethyl. Further, a hydrogen atom(s) in the aryl may be substituted by alkyl, alkenyl, alkenyloxy, hydroxy and/or cyano, which alkyl may be interrupted by an oxygen atom(s) or sulfur atom(s).

Particular Examples of the structure of the phenolic antioxidant represented by General Formula (1) include the Compounds No. 1 to No. 16 described below. However, the present invention is not restricted by the compounds below.

Compound No. 1

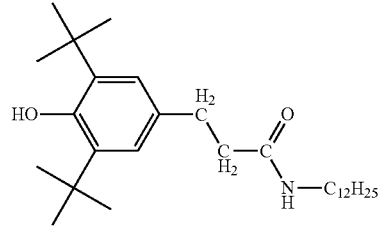

Compound No. 2

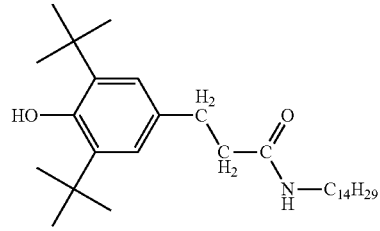

Compound No. 3

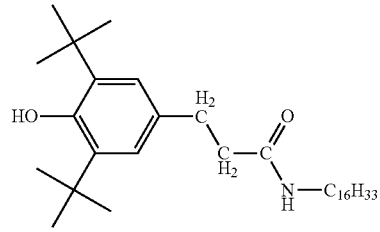

Compound No. 4
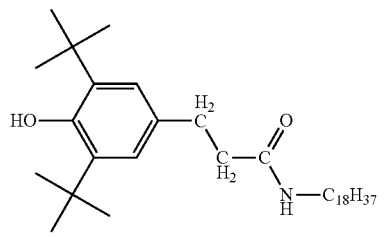
Compound No. 5
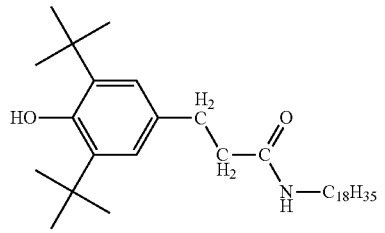
Compound No. 6
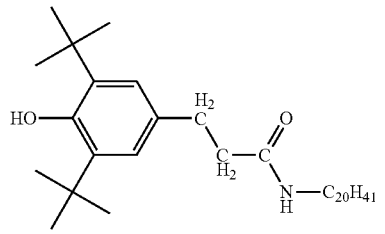
Compound No. 7
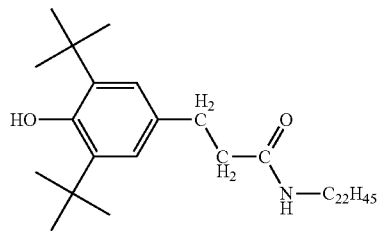
Compound No. 8
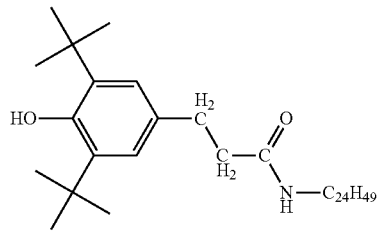
Compound No. 9
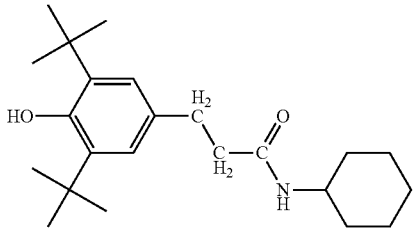
Compound No. 10
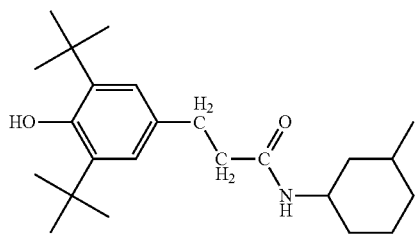
Compound No. 11
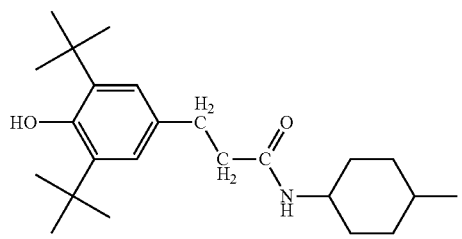
Compound No. 12
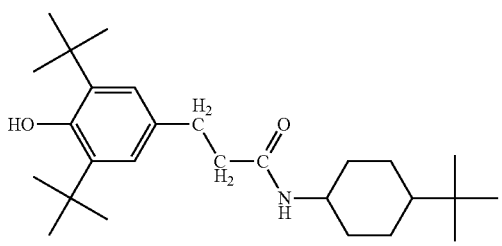
Compound No. 13
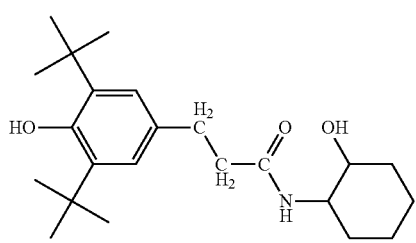
Compound No. 14
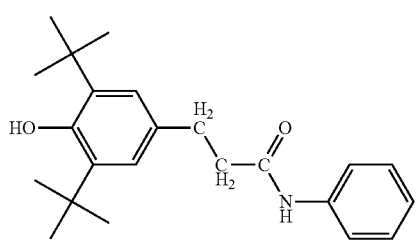
Compound No. 15
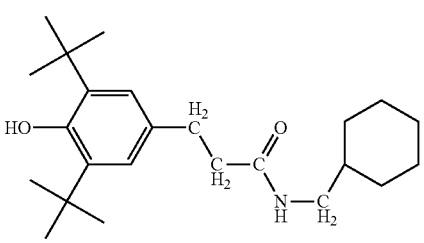

Compound No. 16

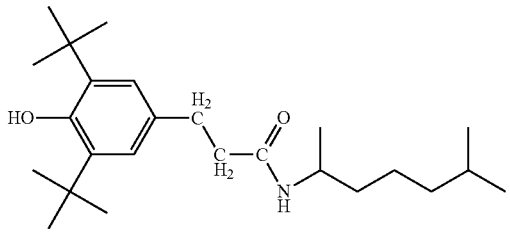

The phenolic antioxidant is used preferably in an amount of 0.001 to 0.5 part by mass, more preferably in an amount of 0.005 to 0.3 part by mass with respect to 100 parts by mass of olefin monomers.

The additive(s) used in the method for producing a stabilized olefin polymer, wherein an additive(s) and a promoter component(s) are supplied to olefin monomers upon polymerization of the olefin monomers, characterized in that the method comprises a step wherein a slurry additive(s) is/are pumped while being mixed with a promoter component(s) in a pipe(s), followed by transferring the resulting mixture to a polymerization tank for olefin monomers, is/are not restricted as long as the additive(s) can be added to olefin polymers, and the additive(s) preferably contain(s) a phenolic antioxidant. The phenolic antioxidant is not restricted as long as the phenolic antioxidants is not decomposed by masking treatment with an organoaluminum compound, and examples of the phenolic antioxidant to be employed include amide compounds of 3-(3,5-dialkyl-4-hydroxyphenyl)propionate such as stearyl-3-(3,5-di-tert-butyl-4-hydroxyphenyl)propionamide, palmityl-3-(3,5-di-tert-butyl-4-hydroxyphenyl)propionamide, myristyl-3-(3,5-di-tert-butyl-4-hydroxyphenyl)propionamide and lauryl-3-(3,5-di-tert-butyl-4-hydroxyphenyl)propionamide; and 1,3,5-trimethyl-2,4,6-tris(3,5-di-tert-butyl-4-hydroxybenzyl)benzene. The phenolic antioxidant is especially preferably one represented by General Formula (1):

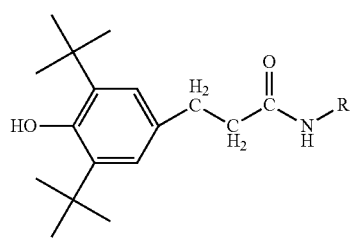

(1)

(wherein R represents $C_1$-$C_{30}$ alkyl which is optionally branched, $C_3$-$C_{12}$ cycloalkyl which is optionally substituted, or $C_6$-$C_{18}$ aryl which optionally has a substituent(s)).

The substituent(s), amount used, and particular examples of the phenolic antioxidant represented by the General Formula (1) are the same as those described above.

The phenolic antioxidant used in the polyolefin powder of the present invention is a compound represented by the General Formula (2) below:

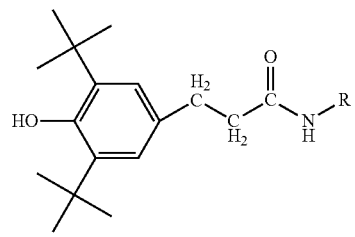

(2)

(wherein R represents $C_1$-$C_{30}$, preferably $C_{12}$-$C_{24}$ alkyl which is optionally branched, $C_3$-$C_{12}$ cycloalkyl which is optionally substituted, or $C_6$-$C_{18}$ aryl which optionally has a substituent(s)), and used preferably in an amount of 0.001 to 0.5 part by mass, more preferably in an amount of 0.005 to 0.3 part by mass with respect to 100 parts by mass of olefin monomers.

Examples of the $C_1$-$C_{30}$ alkyl which is optionally branched, represented by R in the General Formula (2), include methyl, ethyl, propyl, isopropyl, butyl, sec-butyl, tert-butyl, pentyl, sec-pentyl, tert-pentyl, dodecyl, tridecyl, tetradecyl, pentadecyl, hexadecyl, heptadecyl, octadecyl and 1,5-dimethyl-hexyl.

These alkyl groups may be interrupted by an oxygen atom(s) or sulfur atom(s), or an aryl group(s) described below, and a hydrogen atom(s) in the alkyl groups may be substituted by a chain aliphatic group(s) such as hydroxy, cyano, alkenyl and/or alkenyloxy; a cyclic aliphatic group(s) such as pyrrole, furan, thiophene, imidazole, oxazole, thiazole, pyrazole, isoxazole, isothiazole, pyridine, pyridazine, pyrimidine, pyrazine, piperidine, piperazine, morpholine, 2H-pyran, 4H-pyran, phenyl, biphenyl, triphenyl, naphthalene, anthracene, pyrrolidine, pyrindine, indolizine, indole, isoindole, indazole, purine, quinolizine, quinoline, isoquinoline and/or cycloalkyl; and/or an aromatic group(s). Further, a combination of two or more of these interruptions and/or substitutions may be combined.

Examples of the $C_3$-$C_{12}$ cycloalkyl which is optionally substituted, represented by R in the General Formula (2), include cyclopropyl, cyclopentyl, cyclohexyl, cycloheptyl, cyclooctyl, cyclononyl and cyclodecyl, and a hydrogen atom(s) in the cycloalkyl may be substituted by alkyl, alkenyl, alkenyloxy, hydroxy and/or cyano, which alkyl may be interrupted by an oxygen atom(s) and/or a sulfur atom(s).

Examples of the $C_6$-$C_{18}$ aryl which optionally has a substituent(s), represented by R in the General Formula (2), include phenyl, methylphenyl, butylphenyl, octylphenyl, 4-hydroxyphenyl, 3,4,5-trimethoxyphenyl, 4-tert-butylphenyl, biphenyl, naphthyl, methylnaphthyl, anthracenyl, phenanthryl, benzyl, phenylethyl and 1-phenyl-1-methylethyl. Further, a hydrogen atom(s) in the aryl may be substituted by alkyl, alkenyl, alkenyloxy, hydroxy and/or cyano, which alkyl may be interrupted by an oxygen atom(s) or sulfur atom(s).

Particular examples of the structure of the phenolic antioxidant represented by General Formula (2) include the Compounds No. 1 to No. 16 described above. However, the present invention is not restricted by the compounds described above.

Examples of the organoaluminum compound which may be used for masking the phenolic antioxidant include alkylaluminums and alkylaluminum hydrides, among which alkylaluminums are preferred, and trialkyl aluminums are especially preferred. Particular examples of the trialkyl aluminums include trimethyl aluminum, triethyl aluminum, tri-n-propyl aluminum, triisobutyl aluminum, tri-n-hexyl aluminum and tri-n-octyl aluminum. A mixture of any of the above organoaluminum compounds may be used. Aluminoxane, which is obtained by reaction of an alkylaluminum or an alkylaluminum hydride with water, may be similarly used.

The phenolic antioxidant masked by an organoaluminum compound means a phenolic antioxidant wherein the hydrogen atom of its phenolic hydroxyl group is substituted by an organoaluminum compound, which masked phenolic antioxidant can be recycled into a phenolic body by treatment with a hydrogen donor compound such as water, an alcohol or an acid. Among these, those which can recycle phenol by reacting with an inactivator used for deactivation treatment of a catalyst in the polymerization reaction are preferred, and a phenolate (salt) obtained by reaction of an organoaluminum compound with a phenolic antioxidant is especially preferred, which organoaluminum compound normally exists in the polymerization system by a polymerization catalyst for an olefin resin and does not inhibit the polymerization.

The method of the above-described masking can be simply carried out by mixing the organoaluminum compound with the phenolic antioxidant in an inert solvent and stirring the resulting mixture. In the reaction by this method, in cases where a by-produced compound does not affect the polymerization product, the phenolic antioxidant can be used as it is, but in cases where a by-produced compound inhibits the polymerization, the by-produced compound is preferably removed by evaporation under reduced pressure or the like before use of the phenolic antioxidant.

Examples of the inert solvent include aliphatic and aromatic hydrocarbon compounds. Examples of the aliphatic hydrocarbon compounds include saturated hydrocarbon compounds such as n-pentane, n-hexane, n-heptane, n-octane, isooctane and purified kerosene; and cyclic saturated hydrocarbon compounds such as cyclopentane, cyclohexane and cycloheptane; and examples of the aromatic hydrocarbon compounds include compounds such as benzene, toluene, ethylbenzene and xylene. Among these compounds, n-hexane or n-heptane is preferably used. The concentration of the trialkyl aluminum salt in the inert solvent is preferably within the range of 0.001 to 0.5 mol/L, especially preferably within the range of 0.01 to 0.1 mol/L.

Examples of the olefin monomers to obtain the olefin polymer used in the present invention include ethylene, propylene, 1-butene, 1-hexene, 3-methyl-1-butene, 3-methyl-1-pentene, 4-methyl-1-pentene, vinylcycloalkane and styrene, and derivatives thereof.

The olefin polymer is obtained by homopolymerization of the olefin monomers or by copolymerization in which the olefin monomers are involved, and examples of the olefin polymer include polypropylenes such as propylene homopolymers, ethylene-propylene copolymers, and copolymers of propylene and an α-olefin(s) other than propylene, including ethylene-propylene-butene copolymers; polyethylenes such as high-density polyethylenes, linear low-density polyethylenes and low-density polyethylenes; and cycloolefins.

The polymerization of olefin monomers needs to be carried out in the presence of a polymerization catalyst under an atmosphere of an inert gas such as nitrogen, or the polymerization may be carried out in the inert solvent described above. Further, as long as the polymerization is not inhibited, an active hydrogen compound, fine particle carrier, organoaluminum compound, ion-exchangeable layered compound and/or inorganic silicate may be added.

In the present invention, the polymerization catalyst is not restricted, and a known polymerization catalyst may be used. Examples of the polymerization catalyst include compounds of the transition metals belonging to the groups 3 to 11 in the periodic table (e.g., titanium, zirconium, hafnium, vanadium, iron, nickel, lead, platinum, yttrium and samarium), and representative examples of the polymerization catalyst which may be used include Ziegler catalysts, Ziegler-Natta catalysts composed of a titanium-containing solid transition metal component and an organic metal component, metallocene catalysts composed of a compound of a transition metal belonging to the group 4 to 6 in the periodic table having at least one cyclopentadienyl skeleton and a promoter component, and chrome catalysts.

Examples of the method of polymerization of olefin monomers include methods wherein olefin monomers are polymerized to produce an olefin homopolymer and methods wherein propylene and at least one type of olefin (excluding propylene) unit selected from the group consisting of olefin units having 2 to 12 carbon atoms are copolymerized to produce a copolymer, which methods are carried out by slurry polymerization, wherein polymerization is carried out in an inert solvent such as an aliphatic hydrocarbon including butane, pentane, hexane, heptane or isooctane, alicyclic hydrocarbon including cyclopentane, cyclohexane or methylcyclohexane; aromatic hydrocarbon such as toluene, xylene or ethylbenzene; gasoline fraction; or hydrogenated diesel fraction; gas-phase polymerization, wherein polymerization is carried out in a gas phase; bulk polymerization, wherein the olefin monomers themselves are used as a solvent; solution polymerization, wherein a polymer is produced in the form of a liquid; a polymerization method by a combination of two or more of these methods; single-stage polymerization; or multistage polymerization. Further, either a batch-type or continuous-type production method can be used.

In the present invention, in polymerization equipment for bulk polymerization or gas-phase polymerization, or for the combination of these methods, the present invention can be applied using the existing polymerization equipment without modification of the equipment, so that such polymerization equipment is preferably used, and one used for the continuous method is industrially advantageous and hence preferred. In the case of batch polymerization, a masked phenolic antioxidant sometimes precipitates with time and is solidified in a tank. Further, although the present invention can be used also in slurry polymerization, solution polymerization and the like, these polymerization methods require a step of drying olefin polymers, resulting in increase in the energy of production, so that these methods are not preferred in view of power saving.

As a polymerization tank used in the above-described polymerization methods, a continuous reactor in existing equipment may be used without modification, and the present invention is not restricted by the size, shape, material and the like of the conventional polymerization equipment.

In the method of the present invention for recycling a phenolic antioxidant which is masked by an organoaluminum compound and contained in an olefin polymer obtained as mentioned above, a nitrogen gas comprising water and/or a proton donor at a volume ratio of $1.0 \times 10^{-6}$ to $2.5 \times 10^{-2}$, preferably $1.0 \times 10^{-3}$ to $1.5 \times 10^{-2}$ with respect to 1 volume of nitrogen is brought into contact with the olefin polymer. In cases where the volume ratio with respect to 1 volume of nitrogen is less than $1.0 \times 10^{-6}$, recycling of the masked phenolic antioxidant takes a long time, while in cases where the volume ratio is more than $2.5 \times 10^{-2}$, the water content of the obtained olefin polymer is high and bubbles may be generated during processing. For application of the present invention to a continuous production method, the equipment may be one wherein, in a tank to which an olefin polymer is intermittently or continuously supplied, the above-described nitrogen gas can be brought into contact with the olefin polymer. For example, the equipment may be one wherein, in a cylindrical column, an olefin polymer is intermittently or continuously supplied from the upper side of the column and the nitrogen gas is supplied from the bottom of the column, or one wherein an olefin polymer is supplied from the upper side of a tank and the nitrogen gas is supplied from the lower side, which column or tank can discharge the olefin polymer containing a phenolic antioxidant recycled into a phenolic body. Particular examples of the tank include purge columns and steamers.

The proton donor means an active substance which substitutes a hydroxyl group, and examples thereof include alcohols such as methanol, ethanol, 1-propanol, 2-propanol, n-butanol, isobutanol, sec-butanol, tert-butanol, ethylene glycol and glycerin; phenolic substances; and mineral acids such as hydrochloric acid and sulfuric acid. In the present invention, methanol or ethanol is preferably used.

In the method for producing an olefin polymer, wherein a phenolic antioxidant represented by the General Formula (1) which is masked by an organoaluminum compound is supplied upon polymerization when olefin monomers are polymerized, characterized in that steam, or a nitrogen gas comprising moisture is injected into an extruder when the obtained olefin polymer is melt-kneaded in the extruder, it is possible, by bringing steam, or the gas comprising moisture into contact with the olefin polymer when the olefin polymer is melt-kneaded, to recycle the phenolic antioxidant which is masked by an organoaluminum compound and contained in the olefin polymer into a phenolic body. It is especially preferred to install an extruder for mixing as required the olefin polymer with another additive and melt-kneading the resulting mixture, and to introduce steam into the extruder, since further equipment investment is unnecessary in such a case.

The above extruder can be used irrespective of which extrusion method, among the methods such as the uniaxial, biaxial and multiaxial method, is employed, and is not restricted as long as an olefin polymer can be melt and kneaded therewith and steam can be introduced thereto.

In the method for producing a stabilized olefin polymer, wherein an additive(s) and a promoter component(s) are supplied to olefin monomers upon polymerization of the olefin monomers, characterized in that the method comprises a step wherein a slurry additive(s) is/are pumped while being mixed with a promoter component(s) in a pipe(s), followed by transferring the resulting mixture to a polymerization tank for olefin monomers, each additive needs to be in the form of a slurry in order to be supplied to the pipe(s) through which the promoter(s) is/are transferred from a supplying tank(s) of the promoter(s) to a polymerization tank. In cases where each additive is in the form of a liquid, the additive can be transferred as it is, while in cases where the additive is solid, the additive may be, for example, supplied after being mixed with a solvent to be made into a suspended state (slurrying). Further, in cases where the additive is solid, the concentration of the additive in the slurry is preferably within the range of 1 to 80% by mass, and the additive is preferably in a fluid state.

Examples of the above solvent include aliphatic hydrocarbons and alicyclic hydrocarbons. Examples of the aliphatic hydrocarbons include saturated hydrocarbon compounds such as n-pentane, n-hexane, n-heptane, n-octane, isooctane and purified kerosene; and examples of the alicyclic hydrocarbons include cyclopentane, cyclohexane and cycloheptane. In the present invention, n-hexane, n-heptane or paraffin is preferably used. The concentration of the promoter in the solvent is preferably within the range of 0.001 to 0.5 mol/L, especially preferably 0.01 to 0.1 mol/L.

The olefin monomers are not restricted, and examples thereof include the above-described monomers.

Polymerization of the olefin monomers may be carried out in the same manner as described above.

The polymerization catalyst is not restricted, and those which are the same as described above may be used.

Examples of the method of polymerization of the olefin monomers include those which are the same as described above.

Examples of the polymerization tank which may be used include those which are the same as described above.

The olefin polymer is obtained by homopolymerization of the above olefin monomers or by copolymerization in which olefin monomers are involved, and examples of the olefin polymer include polypropylenes such as propylene homopolymers, ethylene-propylene copolymers, and copolymers of propylene and an α-olefin(s) other than propylene, including ethylene-propylene-butene copolymers; polyethylenes such as high-density polyethylenes, linear low-density polyethylenes and low-density polyethylenes; and cycloolefin polymers.

In the polyolefin powder of the present invention, the phenolic antioxidant masked by an organoaluminum means a phenolic antioxidant wherein the hydrogen atom of its phenolic hydroxyl group is substituted by an organoaluminum compound, which phenolic antioxidant was masked by treatment with a hydrogen donor compound such as water, an alcohol or an acid such that the phenolic antioxidant can be recycled into phenol. Among these, those which can recycle phenol by reacting with an inactivator used for deactivation treatment of a catalyst in the polymerization reaction are preferred, and a phenolate (salt) obtained by reaction of an organoaluminum compound with a phenolic antioxidant is especially preferred, which organoaluminum compound normally exists in a polymerization system by a polymerization catalyst for a polyolefin resin and does not inhibit the polymerization.

Examples of the organoaluminum compound include those which are the same as described above.

The masking of a phenolic antioxidant can be simply carried out by mixing a metal compound such as a trialkyl aluminum with a phenolic antioxidant in an inert solvent and stirring the resulting mixture. In the reaction by this method, in cases where a by-produced compound does not affect the polymerization product, the phenolic antioxidant can be used as it is, but in cases where a by-produced compound inhibits the polymerization, the by-produced compound is preferably removed by evaporation under reduced pressure or the like before use of the phenolic antioxidant.

Examples of the inert solvent include those which are the same as described above.

Examples of the phosphorus-containing antioxidant include triphenyl phosphite, trisnonylphenyl phosphite, tris (2,4-di-tert-butylphenyl)phosphite, tris(2,4-di-tert-butyl-5-methylphenyl)phosphite, tris[2-tert-butyl 4-(3-tert-butyl-4-hydroxy-5-methylphenylthio)-5-methylphenyl]phosphite, tridecyl phosphite, octyl diphenyl phosphite, di(decyl) monophenyl phosphite, di(tridecyl)pentaerythritol diphosphite, di(nonylphenyl)pentaerythritol diphosphite, bis(2,4-di-tert-butylphenyl)pentaerythritol diphosphite, bis(2,6-di-tert-butyl-4-methylphenyl)pentaerythritol diphosphite, bis (2,4,6-tri-tert-butylphenyl)pentaerythritol diphosphite, bis(2,4-dicumylphenyl)pentaerythritol diphosphite, tetra(tridecyl) isopropylidenediphenol diphosphite, tetra(tridecyl)-4,4'-n-butylidene bis(2-tert-butyl-5-methylphenol)diphosphite, hexa(tridecyl)-1,1,3-tris(2-methyl-4-hydroxy-5-tert-butylphenyl)butane triphosphite, tetrakis(2,4-di-tert-butylphenyl)biphenylene diphosphonite, 9,10-dihydro-9-oxa-10-phosphaphenanthrene-10-oxide, 2,2'-methylenebis(4,6-di-tert-butylphenyl)-2-ethylhexyl phosphite, 2,2'-methylenebis(4,6-di-tert-butylphenyl)-octadecyl phosphite, 2,2'-ethylidenebis(4,6-di-tert-butylphenyl)fluorophosphite, tris (2-[(2,4,8,10-tetrakis-tert-butyldibenzo[d,f][1,3,2] dioxaphosphepin-6-yl)oxy]ethyl)amine, and known phosphorus-containing antioxidants of 2-ethyl-2-butylpropyleneglycol and 2,4,6-tri-tert-butylphenol. The phosphorus-containing antioxidant is preferably one such as tris(2,4-di-tert-butylphenyl)phosphite, which does not adversely affect polymerization even in cases where the phosphorus-containing antioxidant is added before polymerization of olefin monomers.

The amount of the phosphorus-containing antioxidant used is preferably 0.001 to 3 parts by weight, more preferably 0.005 to 0.5 part by weight with respect to 100 parts by weight of the polyolefin resin.

Examples of the olefin monomers used for the polyolefin powder of the present invention include those described above.

Examples of the polymerization catalyst used for the polyolefin powder of the present invention include those described above.

The polymerization of olefin monomers needs to be carried out under an atmosphere of an inert gas such as nitrogen, or the polymerization may be carried out in the inert solvent described above. Further, as long as the polymerization is not inhibited, an active hydrogen compound, fine particle carrier, organoaluminum compound, ion-exchangeable layered compound and/or inorganic silicate may be added.

Examples of the method of polymerization of olefin monomers include methods wherein olefin monomers are polymerized to produce an olefin homopolymer and methods wherein propylene and at least one type of olefin (excluding propylene) unit selected from the group consisting of olefin units having 2 to 12 carbon atoms are copolymerized to produce a copolymer, which methods are carried out by slurry polymerization, gas-phase polymerization, bulk polymerization, solution polymerization, a polymerization method by a combination of two or more of these methods, single-stage polymerization, or multistage polymerization. Further, the production can be carried out irrespective of whether the method is a batch method or a continuous method. Upon completion of the polymerization, the catalyst can be decomposed by addition of water (vapor) or an alcohol.

To the olefin polymer, another additive which is normally used may be added as required. In a blending method of the another additive, the additive may be added upon polymerization as long as the additive does not inhibit the polymerization. Further examples of the method include a method wherein the another additive is mixed with an olefin polymer at a blending ratio which varies depending on the object, and the resulting mixture is then melt-kneaded in a processor such as an extruder to carry out granulation or molding.

In a method for producing an olefin polymer, wherein a phenolic antioxidant represented by the General Formula (1) below which is masked by an organoaluminum compound is supplied upon polymerization when olefin monomers are polymerized, characterized in that steam, or a nitrogen gas comprising moisture is injected into an extruder when the obtained olefin polymer is melt-kneaded in the extruder, this processing may be carried out either at the same time as or after the introduction of steam.

Examples of the another additive include phosphorus-containing antioxidants, ultraviolet absorbers, hindered amine compounds, heavy metal deactivators, nucleating agents, flame retardants, metallic soaps, hydrotalcites, fillers, lubricants, antistatic agents, pigments, dyes and plasticizers, or a phenolic antioxidant may be further added as the another additive.

Further, to the polyolefin powder of the present invention, still another additive which is normally used may be blended as required. Examples of the blending method of the another additive include a method wherein the additive is slurried by being dissolved in a saturated carbon solvent to an extent at which polymerization of olefin monomers are not inhibited, and the resulting slurry is then added when olefin monomers are polymerized. Further, if possible, the another additive may be mixed at a blending ratio which varies depending on the object, and the resulting mixture may be then melt-kneaded in a processor such as an extruder to carry out granulation. Examples of the another additive include ultraviolet absorbers, hindered amine compounds, heavy metal deactivators, nucleating agents, flame retardants, metallic soaps, hydrotalcites, fillers, lubricants, antistatic agents, pigments, dyes and plasticizers, and, a phenolic antioxidant and/or phosphorus-containing antioxidant used in the present invention and/or another phenolic antioxidant may also be added after the polymerization, followed by processing the resulting polymer.

Examples of the phosphorus-containing antioxidant include those described above.

The amount of the phosphorus-containing antioxidant to be used is preferably 0.001 to 3 parts by weight, more preferably 0.005 to 0.5 part by weight with respect to 100 parts by weight of the olefin polymer.

Examples of the ultraviolet absorbers include 2-hydroxybenzophenones such as 2,4-dihydroxybenzophenone, 2-hydroxy-4-methoxybenzophenone, 2-hydroxy-4-octoxybenzophenone and 5,5'-methylenebis(2-hydroxy-4-methoxybenzophenone); 2-(2-hydroxyphenyl)benzotriazoles such as 2-(2-hydroxy-5-methylphenyl)benzotriazole, 2-(2-hydroxy-5-tert-octylphenyl)benzotriazole, 2-(2-hydroxy-3,5-di-tert-butylphenyl)-5-chlorobenzotriazole, 2-(2-hydroxy-3-tert-butyl-5-methylphenyl)-5-chlorobenzotriazole, 2-(2-hydroxy-3,5-dicumylphenyl)benzotriazole, 2,2'-methylenebis(4-tert-octyl-6-benzotriazolylphenol), polyethylene glycol esters of 2-(2-hydroxy-3-tert-butyl-5-carboxyphenyl)benzotriazole, 2-[2-hydroxy-3-(2-acryloyloxyethyl)-5-methylphenyl]benzotriazole, 2-[2-hydroxy-3-(2-methacryloyloxyethyl)-5-tert-butylphenyl]benzotriazole, 2-[2-hydroxy-3-(2-methacryloyloxyethyl)-5-tert-octylphenyl]benzotriazole, 2-[2-hydroxy-3-(2-methacryloyloxyethyl)-5-tert-butylphenyl]-5-chlorobenzotriazole, 2-[2-hydroxy-5-(2-methacryloyloxyethyl)phenyl]benzotriazole, 2-[2-hydroxy-3-tert-butyl-5-(2-methacryloyloxyethyl)phenyl]benzotriazole, 2-[2-hydroxy-3-tert-amyl-5-(2-methacryloyloxyethyl)phenyl]benzotriazole, 2-[2-hydroxy-3-tert-butyl-5-(3-methacryloyloxypropyl)phenyl]-5-chlorobenzotriazole, 2-[2-hydroxy-4-(2-methacryloyloxymethyl)phenyl]benzotriazole, 2-[2-hydroxy-4-(3-methacryloyloxy-2-hydroxypropyl)phenyl]benzotriazole and 2-[2-hydroxy-4-(3-methacryloyloxypropyl)phenyl]benzotriazole; 2-(2-hydroxyphenyl)-4,6-diaryl-1,3,5-triazines such as 2-(2-hydroxy-4-methoxyphenyl)-4,6-diphenyl-1,3,5-triazine, 2-(2-hydroxy-4-hexyloxyphenyl)-4,6-diphenyl-1,3,5-triazine, 2-(2-hydroxy-4-octoxyphenyl)-4,6-bis(2,4-dimethylphenyl)-1,3,5-triazine, 2-[2-hydroxy-4-(3-$C_{12-13}$ mixed alkoxy-2-hydroxypropoxy)phenyl]-4,6-bis(2,4-dimethylphenyl)-1,3,5-triazine, 2-[2-hydroxy-4-(2-acryloyloxyethoxy)phenyl]-4,6-bis(4-methylphenyl)-1,3,5-triazine, 2-(2,4-dihydroxy-3-allylphenyl)-4,6-bis(2,4-dimethylphenyl)-1,3,5-triazine and 2,4,6-tris(2-hydroxy-3-methyl-4-hexyloxyphenyl)-1,3,5-triazine; benzoates such as phenyl salicylate, resorcinol monobenzoate, 2,4-di-tert-butylphenyl-3,5-di-tert-butyl-4-hydroxybenzoate, octyl(3,5-di-tert-butyl-4-hydroxy)benzoate, dodecyl(3,5-di-tert-butyl-4-hydroxy)benzoate, tetradecyl(3,5-di-tert-butyl-4-hydroxy)benzoate, hexadecyl(3,5-di-tert-butyl-4-hydroxy)benzoate, octadecyl(3,5-di-tert-butyl-4-hydroxy)benzoate and behenyl(3,5-di-tert-butyl-4-hydroxy)benzoate; substituted oxanilides such as 2-ethyl-2'-ethoxyoxanilide and 2-ethoxy-4'-dodecyloxanilide; cyanoacrylates such as ethyl-α-cyano-β,β-diphenylacrylate and methyl-2-cyano-3-methyl-3-(p-methoxyphenyl)acrylate; and various metal salts and metal chelates, especially salts and chelates of nickel and chrome.

The amount of the ultraviolet absorber used is preferably 0.001 to 5 parts by mass, more preferably 0.005 to 0.5 part by mass with respect to 100 parts by mass of the olefin polymer.

Examples of the hindered amine light stabilizers include 2,2,6,6-tetramethyl-4-piperidylstearate, 1,2,2,6,6-pentamethyl-4-piperidylstearate, 2,2,6,6-tetramethyl-4-piperidylbenzoate, bis(2,2,6,6-tetramethyl-4-piperidyl)sebacate, tetrakis(2,2,6,6-tetramethyl-4-piperidyl)-1,2,3,4-butanetetracarboxylate, tetrakis(1,2,2,6,6-pentamethyl-4-piperidyl)-1,2,3,4-butanetetracarboxylate, bis(2,2,6,6-tetramethyl-4-piperidyl).di(tridecyl)-1,2,3,4-butanetetracarboxylate, bis(1,2,2,6,6-pentamethyl-4-piperidyl).di(tridecyl)-1,2,3,4-butanetetracarboxylate, bis(1,2,2,4,4-pentamethyl-4-piperidyl)-2-butyl-2-(3,5-di-tert-butyl-4-hydroxybenzyl)malonate, 1-(2-hydroxyethyl)-2,2,6,6-tetramethyl-4-piperidinol/diethyl succinate polycondensate, 1,6-bis(2,2,6,6-tetramethyl-4-piperidylamino)hexane/2,4-dichloro-6-morpholino-s-triazine polycondensate, 1,6-bis(2,2,6,6-tetramethyl-4-piperidylamino)hexane/2,4-dichloro-6-tert-octylamino-s-triazine polycondensate, 1,5,8,12-tetrakis[2,4-bis(N-butyl-N-(2,2,6,6-tetramethyl-4-piperidyl)amino)-s-triazin-6-yl]-1,5,8,12-tetraazadodecane, 1,5,8,12-tetrakis[2,4-bis(N-butyl-N-(1,2,2,6,6-pentamethyl-4-piperidyl)amino)-s-triazin-6-yl]-1,5,8-12-tetraazadodecane, 1,6,11-tris[2,4-bis(N-butyl-N-(2,2,6,6-tetramethyl-4-piperidyl)amino)-s-triazin-6-yl]aminoundecane, 1,6,11-tris[2,4-bis(N-butyl-N-(1,2,2,6,6-pentamethyl-4-piperidyl)amino)-s-triazin-6-yl]aminoundecane, bis[4-(1-octyloxy-2,2,6,6-tetramethyl)piperidyl]decanedionate, bis[4-(2,2,6,6-tetramethyl-1-undecyloxy)piperidyl]carbonate, and TINUVIN NOR 371 manufactured by Ciba Specialty Chemicals K.K.

The amount of the hindered amine light stabilizer to be used is preferably 0.001 to 5 parts by mass, more preferably 0.005 to 0.5 part by mass with respect to 100 parts by mass of the olefin polymer.

Examples of the nucleating agents include metal salts of carboxylic acids such as sodium benzoate, aluminum 4-tert-butyl benzoate, sodium adipate and disodium bicyclo[2.2.1]heptane-2,3-dicarboxylate; phosphoric ester metal salts such as sodium bis(4-tert-butylphenyl)phosphate, sodium-2,2'-methylenebis(4,6-di-tert-butylphenyl)phosphate and lithium-2,2'-methylenebis(4,6-di-tert-butylphenyl)phosphate; polyol derivatives such as dibenzylidene sorbitol, bis(methylbenzylidene)sorbitol, bis(p-ethylbenzylidene)sorbitol and bis(dimethylbenzylidene)sorbitol; and amide compounds such as N,N',N''-tris[2-methylcyclohexyl]-1,2,3-propanetricarboxamide (RIKACLEAR PC1), N,N',N''-tricyclohexyl-1,3,5-benzenetricarboxamide, N,N'-dicyclohexyl-naphthalenedicarboxamide and 1,3,5-tri(dimethylisopropylamino)benzene.

The amount of the nucleating agent to be used is preferably 0.001 to 10 parts by mass, more preferably 0.005 to 5 parts by mass with respect to 100 parts by mass of the olefin polymer.

Examples of the flame retardants include aromatic phosphates such as triphenyl phosphate, tricresyl phosphate, trixylenyl phosphate, cresyl diphenyl phosphate, cresyl-2,6-xylenyl phosphate and resorcinol bis(diphenylphosphate); phosphonates such as divinyl phenyl phosphonate, diallyl phenyl phosphonate and (1-butenyl)phenyl phosphonate; phosphinates such as phenyl diphenyl phosphinate, methyl diphenyl phosphinate and 9,10-dihydro-9-oxa-10-phosphaphenanthrene-10-oxide derivatives; phosphazene compounds such as bis(2-allylphenoxy)phosphazene and dicresylphosphazene; phosphorus-containing flame retardants such as melamine phosphate, melamine pyrophosphate, melamine polyphosphate, melam polyphosphate, ammonium polyphosphate, phosphorus-containing vinylbenzyl compounds and red phosphorus; metal hydroxides such as magnesium hydroxide and aluminum hydroxide; bromine-containing flame retardants such as brominated bisphenol A epoxy resins, brominated phenol novolac epoxy resins, hexabromobenzene, pentabromotoluene, ethylenebis(pentabromophenyl), ethylenebistetrabromophthalimide, 1,2-dibromo-4-(1,2-dibromoethyl)cyclohexane, tetrabromocyclooctane, hexabromocyclododecane, bis(tribromophenoxy)ethane, brominated polyphenylene ether, brominated polystyrene and 2,4,6-tris(tribromophenoxy)-1,3,5-triazine, tribromophenyl maleimide, tribromophenyl acrylate, tribromophenyl methacrylate, tetrabromobisphenol A dimethacrylate, pentabromobenzyl acrylate and brominated styrene.

The amount of the flame retardant to be used is preferably 1 to 70 parts by mass, more preferably 10 to 30 parts by mass with respect to 100 parts by mass of the olefin polymer.

Examples of the another phenolic antioxidant include 2,6-di-tert-butyl-p-cresol, 2,6-diphenyl-4-octadecyloxyphenol, stearyl(3,5-di-tert-butyl-4-hydroxyphenyl)propionate, distearyl(3,5-di-tert-butyl-4-hydroxybenzyl)phosphonate, tridecyl-3,5-di-tert-butyl-4-hydroxybenzylthioacetate, thiodiethylene-bis[(3,5-di-tert-butyl-4-hydroxyphenyl)propionate], 4,4'-thio-bis(6-tert-butyl-m-cresol), 2-octylthio-4,6-di(3,5-di-tert-butyl-4-hydroxyphenoxy)-s-triazine, 2,2'-methylene-bis(4-methyl-6-tert-butylphenol), bis[3,3-bis(4-hydroxy-3-tert-butylphenyl)butyric acid]glycol ester, 4,4'-butylidene-bis(2,6-di-tert-butylphenol), 4,4'-butylidene-bis(6-tert-butyl-3-methylphenol), 2,2'-ethylidene-bis(4,6-di-tert-butylphenol), 1,1,3-tris(2-methyl-4-hydroxy-5-tert-butylphenyl)butane, bis[2-tert-butyl-4-methyl-6-(2-hydroxy-3-tert-butyl-5-methylbenzyl)phenyl]terephthalate, 1,3,5-tris(2,6-dimethyl-3-hydroxy-4-tert-butylbenzyl)isocyanurate, 1,3,5-tris(3,5-di-tert-butyl-4-hydroxybenzyl)isocyanurate, 1,3,5-tris(3,5-di-tert-butyl-4-hydroxybenzyl)-2,4,6-trimethylbenzene, 1,3,5-tris[(3,5-di-tert-butyl-4-hydroxyphenyl)propionyloxyethyl]isocyanurate, tetrakis[methylene-3-(3',5'-di-tert-butyl-4'-hydroxyphenyl)propionate]methane, 2-tert-butyl-4-methyl-6-(2-acroyloxy-3-tert-butyl-5-methylbenzyl)phenol, 3,9-bis[2-(3-tert-butyl-4-hydroxy-5-methylhydrocinnamoyloxy)-1,1-dimethylethyl]-2,4,8,10-tetraoxaspiro[5.5]undecane and triethylene glycol bis[β-(3-tert-butyl-4-hydroxy-5-methylphenyl)propionate].

The amount of the another phenolic antioxidant to be used is preferably 0.001 to 10 parts by mass, more preferably 0.01 to 5 parts by mass with respect to 100 parts by mass of the olefin polymer.

The fiber obtained using a polyolefin powder of the present invention can be generally employed in uses wherein polyolefin fibers have been conventionally employed, and examples of the uses include substrates for printing; substrates for wallpapers; wiping materials; various filter materials; medical and sanitary materials such as stupe materials and sanitary products; clothing; interlining for clothing; pillowcases; decorative substrates; automotive interior materials; sound absorbing materials; packaging materials; and industrial materials such as those for engineering works.

EXAMPLES

The present invention will be described in more detail by way of the Production Examples, Examples, Comparative Examples and Evaluation Examples below, but the present invention is not restricted by these Examples and the like. The Production Examples are examples of the method for producing an olefin polymer which is obtained by polymerization of olefin monomers, and the Examples are examples of the method of recycling of a phenolic antioxidant, which is masked by an organoaluminum compound and contained in an olefin polymer, into a phenolic body.

Production Example 1

Bulk Polymerization

According to the following procedure ([1] preparation of a catalyst slurry, [2] masking treatment of a phenolic antioxidant, and [3] polymerization of olefin monomers), an olefin polymer was obtained by bulk polymerization.

[1] Preparation of Catalyst Slurry

A homogeneous solution was prepared by mixing 4.76 g (50 mmol) of anhydrous magnesium chloride, 25 mL of decane and 23.4 mL (150 mmol) of 2-ethylhexyl alcohol together and allowing the reaction to proceed under heat at 130° C. for 2 hours. This was followed by addition of 1.11 g (7.5 mmol) of phthalic anhydride to the homogeneous solution and stirring the resulting mixture for 1 hour while maintaining a temperature of 130° C., to dissolve the phthalic anhydride in the homogeneous solution. Subsequently, the homogeneous solution was cooled to room temperature, and its total amount was fed dropwise to 200 mL (1.8 mol) of titanium tetrachloride kept at −20° C., for 1 hour. After completion of the feeding, the temperature was increased to 110° C. for 4 hours. When the temperature reached 110° C., 2.68 mL (12.5 mmol) of diisobutyl phthalate was added, and the resulting mixture was stirred for 2 hours while the temperature of 110° C. was maintained, to allow the reaction to proceed. After completion of the reaction, hot filtration was carried out to collect the residue, and the residue was resuspended in 200 mL of titanium tetrachloride, followed by heating the resulting suspension again to 110° C. and then allowing the reaction to proceed for 2 hours. After completion of the reaction, hot filtration was carried out again to collect the residue, and the residue was washed sufficiently with decane and hexane at 110° C. until free titanium compounds in the washing liquid became undetectable, to obtain a solid titanium catalyst component. An aliquot of the solid titanium catalyst component was dried and subjected to analysis of the catalyst composition, and, as a result, the composition was turned out to be 3.1% by weight titanium, 56.0% by weight chlorine, 17.0% by weight magnesium and 20.9% by weight isobutyl phthalate.

To the solid titanium catalyst component synthesized by the above production method, heptane was added such that a concentration of 5 mg/mL was achieved as a slurry in heptane, to prepare a catalyst slurry.

[2] Masking Treatment of Phenolic Antioxidant

To 50 mL of a container wherein the atmosphere was replaced with nitrogen, 18 g of heptane, 3 g (0.026 mol) of triethylaluminum and, as a phenolic antioxidant, 9 g of the above-described Compound No. 4 were added, to prepare a stabilizer solution containing a masked phenolic antioxidant.

[3] Polymerization of Olefin Monomers (Bulk Polymerization)

In a 1000-mL pressure-resistant reactor wherein the atmosphere was replaced with nitrogen, 35.4 mg of triethylaluminum, 33.3 mg of the stabilizer solution prepared in the above [2], 30 mg of a phosphorus-containing antioxidant: tris(2,4-di-tert-butylphenyl)phosphite, 7.08 mg (0.031 mmol) of dicyclopentyldimethoxysilane and the catalyst slurry prepared in the above [1] (0.0021 mmol in terms of the titanium component) were mixed together, and the resulting mixture was stirred for 2 minutes.

After replacing the atmosphere in the pressure-resistant reactor with propylene, hydrogen was fed to the reactor to a hydrogen pressure of 0.2 bar G, while the total pressure was kept at 38.2 bar G by continuously introducing propylene into the pressure-resistant reactor, thereby performing prepolymerization at 25° C. for 3 minutes. Thereafter, while the propylene pressure was maintained at 38.2 bar G, the temperature was increased to 70° C. and polymerization reaction was performed for 1 hour. After completion or the reaction, the polymer containing the solvent was transferred into a cylindrical container wherein the atmosphere was replaced with nitrogen, and the solvent was transferred to a flare line for solvent removal, to obtain the olefin polymer 1 as white solids.

Production Example 2

Gas-Phase Polymerization

According to the following procedure ([1] preparation of a catalyst slurry, [2] masking treatment of a phenolic antioxidant, and [3] polymerization of olefin monomers), the olefin polymer 2 was obtained.

[1] Preparation of Catalyst Slurry

A catalyst slurry was prepared in the same manner as in [1] in the above Production Example 1.

[2] Masking Treatment of Phenolic Antioxidant

To 50 mL of heptane, 0.15 g (1.3 mmol) of triethylaluminum and, as a phenolic antioxidant, 10 mg of the above-described Compound No. 4 were added, and the resulting mixture was stirred for 2 hours, to perform masking treatment of the phenolic antioxidant.

[3] Polymerization of Olefin Monomers (Gas-Phase Polymerization)

In a 1000-mL autoclave wherein the atmosphere was replaced with nitrogen, 400 mL of heptane was placed, and 0.148 g (1:3 mmol) of triethylaluminum, 29.7 mg (0.13 mmol) of dicyclopentyldimethoxysilane, and the catalyst slurry prepared in the above [1] (0.12 mg in terms of the titanium component) were added thereto.

After replacing the atmosphere in the autoclave with propylene, a pressure of 1 kgf/cm$^2$ G was applied with propylene, and prepolymerization was carried out at 35° C. for 10 minutes. Thereafter, propylene was purged to decrease the pressure, and 150 mL of hydrogen (23° C.) was then introduced, followed by increasing the temperature to 60° C., supplying propylene into the autoclave such that a pressure of 5 kgf/cm$^2$ G was achieved, and performing polymerization for 1 hour. The obtained polymer was subjected twice to the following purification to obtain the olefin polymer 2.

(Purification)

After replacing the atmosphere with nitrogen, the polymer was left in the autoclave, while heptane as the supernatant fluid was decanted. Heptane contained in the polymer was evaporated by evacuating the autoclave, to dry the polymer. In the autoclave, 10 g of the dried polymer was left, and 44.5 mg (3.9 mmol) of triethylaluminum, 89 mg (0.39 mmol) of dicyclopentyldimethoxysilane, the catalyst slurry prepared in [1] (0.37 mg in terms of the titanium component), and 30 mg of a phosphorus-containing antioxidant: tris(2,4-di-tert-butylphenyl)phosphite were added thereto.

After replacing the atmosphere with propylene, propylene was purged to decrease the pressure, and 150 mL of hydrogen (23° C.) was then introduced, followed by increasing the temperature to 70° C. while keeping the propylene pressure at 5 kgf/cm$^2$ G to perform gas-phase polymerization for 1 hour, to purity the polymer.

Example 1-1

A commercially available high-purity nitrogen gas was passed through water, to obtain a nitrogen gas having a moisture content of $1.2 \times 10^{-3}$ in terms of the volume ratio with respect to 1 volume of nitrogen.

Subsequently, the olefin polymer 1 obtained in the above Production Example 1 was transferred, with the solvent contained therein, to a purge column, and the solvent was transferred under nitrogen atmosphere to a flare line for solvent removal. With the olefin polymer after removal of the solvent, the above-described nitrogen gas was brought into contact by flowing the nitrogen gas from the bottom of the cylindrical container at a flow rate of 100 mL/min. for 5 hours, to perform recycling treatment of the masked phenolic antioxidant contained in the olefin polymer.

Example 1-2

Example 1-2 was carried out in the same manner as the above Example 1-1 except that a nitrogen gas having a moisture content of $1.0 \times 10^{-2}$ in terms of the volume ratio with respect to 1 volume of nitrogen was used instead of the nitrogen gas having a moisture content of $1.2 \times 10^{-3}$ in terms of the volume ratio with respect to 1 volume of nitrogen.

Comparative Example 1-1

Comparative Example 1-1 was carried out in the same manner as the above Example 1-1 except that a nitrogen gas having a moisture content of $5.3 \times 10^{-7}$ in terms of the volume ratio with respect to 1 volume of nitrogen was used instead of the nitrogen gas having a moisture content of $1.2 \times 10^{-3}$ in terms of the volume ratio with respect to 1 volume of nitrogen.

Comparative Example 1-2

Comparative Example 1-2 was carried out in the same manner as the above Example 1-1 except that a nitrogen gas having a moisture content of $2.7 \times 10^{-2}$ in terms of the volume ratio with respect to 1 volume of nitrogen was used instead of the nitrogen gas having a moisture content of $1.2 \times 10^{-3}$ in terms of the volume ratio with respect to 1 volume of nitrogen.

Comparative Example 1-3

The olefin polymer 1 obtained in the above Production Example 1 was transferred, with the solvent contained therein, to a purge column, and the solvent was transferred under nitrogen atmosphere to a flare line for solvent removal. Subsequently, steam at 5 kPa was brought into contact with the polymer at a flow rate of 100 mL/min. from the lower side of the column on the cylinder of the purge column.

Reference Example 1

The olefin polymer with which steam was brought into contact in the above Comparative Example 1-3 was dried at 40° C. for 5 hours.
(Evaluation of Stabilization Effect)

In terms of the olefin polymers obtained in Production Example 1, each of the olefin polymers obtained by the methods of the above Examples 1-1 and 1-2 and Comparative Examples 1-1 to 1-3 was processed into pellets by granulation using a uniaxial extruder (apparatus: Plastomill μ, manufactured by Toyo Seiki Seisaku-sho, LTD.; extrusion temperature, 230° C.; screw speed, 50 rpm). Based on the difference between the weight average molecular weights observed before and after the granulation, the stabilization effect of each olefin polymer was evaluated.

The weight average molecular weights were measured by gel permeation chromatography (apparatus: GPC 2000, manufactured by Waters Corporation; columns: 2 columns of Styragel HT 6E and 1 column of Styragel HT2, manufactured by Waters Corporation; measurement temperature: 135° C.; solvent: o-dichlorobenzene; concentration: 6 mg/10 g).

In the above (Evaluation of Stabilization Effect), presence/absence of bubbling was confirmed upon the extrusion.

The respective results are shown in Table 1 below.

TABLE 1

| | Method of production of olefin polymer | Fluid | Proton donor [volume ratio with respect to nitrogen] | Evaluation of stabilization effect Weight average molecular weight of olefin polymer, Mw × 10$^5$ | | |
|---|---|---|---|---|---|---|
| | | | | Before granulation | After granulation | Bubbling |
| Example 1-1 | Bulk polymerization | Nitrogen gas | Moisture $1.2 \times 10^{-3}$ | 4.02 | 4.05 | No |
| Example 1-2 | Bulk polymerization | Nitrogen gas | Moisture $1.0 \times 10^{-2}$ | 3.99 | 4.01 | No |
| Comparative Example 1-1 | Bulk polymerization | Nitrogen gas | Moisture $5.3 \times 10^{-7}$ | 4.06 | 3.55 | No |
| Comparative Example 1-2 | Bulk polymerization | Nitrogen gas | Moisture $2.7 \times 10^{-2}$ | 4.08 | 4.05 | Yes |
| Comparative Example 1-3 | Bulk polymerization | Steam | — | 4.03 | 4.06 | Yes |

TABLE 1-continued

| Method of production of olefin polymer | Fluid | Proton donor [volume ratio with respect to nitrogen] | Evaluation of stabilization effect Weight average molecular weight of olefin polymer, Mw × 10$^5$ | | |
|---|---|---|---|---|---|
| | | | Before granulation | After granulation | Bubbling |
| Reference Example 1* | Bulk polymerization | Steam | — | 4.10 | 4.08 | No |

Reference Example 1*: After Comparative Example 1-3, a drying step was carried out at 40° C. for 5 hours.

As is evident from the results of Comparative Example 1-1 in Table 1, the treatment with a nitrogen gas having a moisture content of less than $1.0 \times 10^{-6}$ in terms of the volume ratio with respect to 1 volume of nitrogen resulted in insufficient recycling of the phenolic antioxidant contained in the olefin polymer, and the molecular weight of the olefin polymer drastically decreased. Further, as is evident from the results of Comparative Example 1-2, in cases where the treatment was carried out with a nitrogen gas having a moisture content of more than $1.5 \times 10^{-3}$ in terms of the volume ratio with respect to 1 volume of nitrogen, and, as is evident from the results of Comparative Example 1-3, in cases where the treatment was carried out with steam, although a sufficient stabilization effect could be obtained, the water content of the olefin polymer was too much, leading to unstable production due to bubbling during the granulation process.

In contrast, by recycling of the phenolic antioxidant by the method of the present invention, an olefin polymer having an excellent stabilization effect could be obtained.

Although, as shown in Reference Example 1, the problem of bubbling during the granulation process, which occurs in cases where the treatment with steam was carried out, can be solved by introduction of a step of drying of the olefin polymer, a drying apparatus is additionally required and hence more equipment investment is necessary, which is industrially disadvantageous compared to the method of the present invention.

Example 2-1

A commercially available high-purity nitrogen gas was passed through water, to obtain a nitrogen gas having a moisture content of $1.2 \times 10^{-3}$ in terms of the volume ratio with respect to 1 volume of nitrogen.

Subsequently, the olefin polymer 2 obtained in the above Production Example 2 was transferred, with the solvent contained therein, from the upper part of an upright cylindrical container wherein the atmosphere was replaced with nitrogen, and a nitrogen gas having a moisture content of $1.2 \times 10^{-3}$ (in terms of the volume ratio with respect to nitrogen) was flown from the lower part of the cylindrical container at a flow rate of 100 mL/min. for 1 hour, to perform recycling treatment of the masked phenolic antioxidant contained in the olefin polymer 2.

Example 2-2

Example 2-2 was carried out in the same manner as in the above Example 2-1 except that a nitrogen gas having a moisture content of $1.0 \times 10^{-2}$ (in terms of the volume ratio with respect to nitrogen) was used instead of the nitrogen gas having a moisture content of $1.2 \times 10^{-3}$ (in terms of the volume ratio with respect to nitrogen).

Example 2-3

Example 2-3 was carried out in the same manner as the above Example 2-1 except that methanol was used instead of water.

Example 2-4

Example 2-4 was carried out in the same manner as the above Example 2-1 except that ethanol was used instead of water.

Comparative Example 2-1

Comparative Example 2-1 was carried out in the same manner as the above Example 2-1 except that a nitrogen gas having a moisture content of $5.3 \times 10^{-7}$ in terms of the volume ratio with respect to 1 volume of nitrogen was used instead of the nitrogen gas having a moisture content of $1.2 \times 10^{-3}$ in terms of the volume ratio with respect to 1 volume of nitrogen.

Comparative Example 2-2

Comparative Example 2-2 was carried out in the same manner as the above Example 2-1 except that a nitrogen gas having a moisture content of $2.7 \times 10^{-2}$ in terms of the volume ratio with respect to 1 volume of nitrogen was used instead of the nitrogen gas having a moisture content of $1.2 \times 10^{-3}$ in terms of the volume ratio with respect to 1 volume of nitrogen.

Comparative Example 2-3

The olefin polymer 2 obtained in the above Production Example 2 was transferred, with the solvent contained therein, to a purge column, and the solvent was transferred under nitrogen atmosphere to a flare line for solvent removal. Subsequently, steam at a pressure of 5 kPa was brought into contact with the polymer at a flow rate of 100 mL/min. from the lower side of the column on the cylinder of the purge column.

Reference Example 2

The olefin polymer with which steam was brought into contact in the above Comparative Example 2-3 was dried at 40° C. for 5 hours.

(Evaluation of Stabilization Effect)

Each of the olefin polymers obtained in the above Examples and Comparative Examples was processed into pellets by granulation using a uniaxial extruder (apparatus: Plastomill μ, manufactured by Toyo Seiki Seisaku-sho, LTD.; extrusion temperature, 230° C.; screw speed, 50 rpm), and, based on the difference between the weight average molecular weights observed before and after the extrusion, the stabilization effect of each olefin polymer was evaluated.

The weight average molecular weights were measured by gel permeation chromatography (apparatus: GPC 2000, manufactured by Waters Corporation; columns: 2 columns of Styragel HT 6E and 1 column of Styragel HT2, manufactured by Waters Corporation; measurement temperature: 145° C.; solvent: o-dichlorobenzene; concentration: 4 mg/10 g).

Further, in the evaluation of the stabilization effect, presence/absence of bubbling was confirmed upon the extrusion of pellets.

The respective results are shown in Table 2 below.

TABLE 2

| | Method of production of olefin polymer | Fluid | Proton donor [volume ratio with respect to nitrogen] | Evaluation of stabilization effect Weight average molecular weight of olefin polymer, Mw × 10$^5$ | | |
|---|---|---|---|---|---|---|
| | | | | Before granulation | After granulation | Bubbling |
| Example 2-1 | Gas-phase polymerization | Nitrogen gas | Moisture $1.2 \times 10^{-3}$ | 3.66 | 3.64 | No |
| Example 2-2 | Gas-phase polymerization | Nitrogen gas | Moisture $1.0 \times 10^{-2}$ | 3.49 | 3.53 | No |
| Example 2-3 | Gas-phase polymerization | Nitrogen gas | Methanol | 3.52 | 3.51 | No |
| Example 2-4 | Gas-phase polymerization | Nitrogen gas | Ethanol | 3.60 | 3.57 | No |
| Comparative Example 2-1 | Gas-phase polymerization | Nitrogen gas | Moisture $5.3 \times 10^{-7}$ | 3.58 | 2.85 | No |
| Comparative Example 2-2 | Gas-phase polymerization | Nitrogen gas | Moisture $2.7 \times 10^{-2}$ | 3.58 | 3.58 | Yes |
| Comparative Example 2-3 | Gas-phase polymerization | Steam | — | 3.61 | 3.58 | Yes |
| Reference Example 2* | Gas-phase polymerization | Steam | — | 3.71 | 3.68 | No |

Reference Example 2*: After Comparative Example 2-3, a drying step was carried out at 40° C. for 5 hours.

As shown by the results of Comparative Example 2-1 in Table 2, the treatment with a nitrogen gas having a moisture content of less than $1.0 \times 10^{-6}$ in terms of the volume ratio with respect to 1 volume of nitrogen resulted in insufficient recycling of the phenolic antioxidant contained in the olefin polymer, and the molecular weight of the olefin polymer drastically decreased. Further, as shown by the results of Comparative Example 2-2, in cases where the treatment was carried out with a nitrogen gas having a moisture content of more than $2.5 \times 10^{-2}$ in terms of the volume ratio with respect to 1 volume of nitrogen, and, as is evident from the results, of Comparative Example 2-3, in cases where the treatment was carried out with steam, although a sufficient stabilization effect could be obtained, the water content of the olefin polymer was too much, leading to unstable production due to bubbling during the granulation process.

In contrast, by recycling of the phenolic antioxidant by the method of the present invention, an olefin polymer having an excellent stabilization effect could be obtained.

Further, by Examples 2-3 and 2-4, it was confirmed that the effect of the present invention can be obtained also by using, as an alternative to moisture, a proton donor such as methanol or ethanol.

Although, as shown in Reference Example 2, the problem of bubbling during granulation, which occurs in cases where the treatment with steam was carried out, can be solved by introduction of a step of drying of the olefin polymer, it is industrially disadvantageous, compared to the method of the present invention, to newly introduce the drying step since there may be restriction of the space for installation of a drying apparatus and more equipment investment may be required.

Production Example 3

Slurry Polymerization

According to the following procedure ([1] preparation of a catalyst slurry, [2] masking treatment of a phenolic antioxidant, and [3] polymerization of olefin monomers), the olefin polymer 3 was obtained by slurry polymerization.

[1] Preparation of Catalyst Slurry

A homogeneous solution was prepared by mixing 4.76 g (50 mmol) of anhydrous magnesium chloride, 25 mL of decane and 23.4 mL (150 mmol) of 2-ethylhexyl alcohol together and allowing the reaction to proceed under heat at 130° C. for 2 hours. This was followed by addition of 1.11 g (7.5 mmol) of phthalic anhydride to the homogeneous solution and stirring the resulting mixture for 1 hour while maintaining a temperature of 130° C., to dissolve the phthalic anhydride in the homogeneous solution. Subsequently, the homogeneous solution was cooled to room temperature, and its total amount was fed dropwise to 200 mL (1.8 mol) of titanium tetrachloride kept at −20° C., for 1 hour. After completion of the feeding, the temperature was increased to 110° C. for 4 hours. When the temperature reached 110° C., 2.68 mL (12.5 mmol) of diisobutyl phthalate was added, and the resulting mixture was stirred for 2 hours while the temperature of 110° C. was maintained, to allow the reaction to proceed. After completion of the reaction, hot filtration was carried out to collect the residue, and the residue was resuspended in 200 mL of titanium tetrachloride, followed by heating the resulting suspension again to 110° C. and then allowing the reaction to proceed for 2 hours. After completion of the reaction, hot filtration was carried out again to collect the residue, and the residue was washed sufficiently with decane and hexane at 110° C. until free titanium compounds in the washing liquid became undetectable, to obtain a solid titanium catalyst component. An aliquot of the solid titanium catalyst component was dried and subjected to analysis of the catalyst composition, and, as a result, the composition was turned out to be 3.1% by weight titanium, 56.0% by weight chlorine, 17.0% by weight magnesium and 20.9% by weight isobutyl phthalate.

To the solid titanium catalyst component synthesized by the above production method, heptane was added such that a concentration of 5 mg/mL was achieved as a slurry in heptane, to prepare a catalyst slurry.

[2] Masking Treatment of Phenolic Antioxidant

To 50 mL of toluene, 3 g of triisobutylaluminum and, as a phenolic antioxidant, 2 g of the above-described Compound No. 4 were added, and the resulting mixture was stirred for 2 hours at room temperature, to obtain a stabilizer solution containing a masked phenolic antioxidant.

[3] Polymerization of Olefin Monomers

In a 1000-mL autoclave wherein the atmosphere was replaced with nitrogen, 400 mL of heptane, 30 mg of a phosphorus-containing antioxidant: tris(2,4-di-tert-butylphenyl) phosphite, and 50 mL of the stabilizer solution obtained by the masking treatment of the phenolic antioxidant in the above-described [2] were placed, and the resulting mixture was stirred at 23° C. for 5 minutes. Further, 1.14 g (5.0 mmol) of dicyclopentyldimethoxysilane and the catalyst slurry prepared in the above-described [1] (5 mmol in terms of the titanium component) were added to the mixture, and the resulting mixture was stirred for 2 minutes.

After replacing the atmosphere in the autoclave with propylene, prepolymerization was carried out at a propylene pressure of 1 kgf/cm$^2$ G at 35° C. for 10 minutes. Thereafter, propylene was purged, and 150 mL of hydrogen (23° C.) was introduced to the autoclave, followed by applying a pressure of 5 kgf/cm$^2$ G with propylene, increasing the temperature to 70° C., and performing polymerization for 1 hour while maintaining the pressure.

Thereafter, the atmosphere in the autoclave was replaced with nitrogen, and the solvent was evaporated, to obtain the olefin polymer 3.

Example 3-1

The olefin polymer 3 obtained in the above Production Example 3 was subjected to granulation using a biaxial extruder (apparatus: PCM-30, manufactured by Ikegai Corp.; extrusion temperature, 230° C.; screw speed, 50 rpm). The granulation was carried out under nitrogen atmosphere until the olefin polymer 3 was fed into the biaxial extruder, and, under suction through vents in the vicinity of the head portion and in the vicinity of the central portion of the screw of the biaxial extruder, steam was injected into the barrel at a pressure of 15 kPa and a flow rate of 100 mL/min. between the feed inlet of the olefin polymer 1 and the vents, to obtain pellets.

Example 3-2

Example 3-2 was carried out in the same manner as Example 3-1 except that, instead of steam, a nitrogen gas having a moisture content of 0.1% in terms of the volume ratio with respect to nitrogen was introduced at a flow rate of 100 mL/min., to obtain pellets.

Comparative Example 3-1

Comparative Example 3-1 was carried out in the same manner as the above Example 3-1 except that the introduction of steam and the suction through vents were not carried out during granulation of the olefin polymer, to obtain pellets.

Production Example 4

Bulk Polymerization

According to the following procedure ([1] preparation of a catalyst slurry, [2] masking treatment of a phenolic antioxidant, and [3] polymerization of olefin monomers), the olefin polymer 4 was obtained by bulk polymerization.

[1] Preparation of Catalyst Slurry

A homogeneous solution was prepared by mixing 4.76 g (50 mmol) of anhydrous magnesium chloride, 25 mL of decane and 23.4 mL (150 mmol) of 2-ethylhexyl alcohol together and allowing the reaction to proceed under heat at 130° C. for 2 hours. This was followed by addition of 1.11 g (7.5 mmol) of phthalic anhydride to the homogeneous solution and stirring the resulting mixture for 1 hour while maintaining the temperature of 130° C., to dissolve the phthalic anhydride in the homogeneous solution. Subsequently, the homogeneous solution was cooled to room temperature, and its total amount was fed dropwise to 200 mL (1.8 mol) of titanium tetrachloride kept at −20° C., for 1 hour. After completion of the feeding, the temperature was increased to 110° C. for 4 hours. When the temperature reached 110° C., 2.68 mL (12.5 mmol) of diisobutyl phthalate was added, and the resulting mixture was stirred for 2 hours while the temperature of 110° C. was maintained, to allow the reaction to proceed. After completion of the reaction, hot filtration was carried out to collect the residue, and the residue was resuspended in 200 mL of titanium tetrachloride, followed by heating the resulting suspension again to 110° C. and then allowing the reaction to proceed for 2 hours. After completion of the reaction, hot filtration was carried out again to collect the residue, and the residue was washed sufficiently with decane and hexane at 110° C. until free titanium compounds in the washing liquid became undetectable, to obtain a solid titanium catalyst component. An aliquot of the solid titanium catalyst component was dried and subjected to analysis of the catalyst composition, and, as a result, the composition was turned out to be 3.1% by weight titanium, 56.0% by weight chlorine, 17.0% by weight magnesium and 20.9% by weight isobutyl phthalate.

To the solid titanium catalyst component synthesized by the above production method, heptane was added such that a concentration of 5 mg/mL was achieved as a slurry in heptane, to prepare a catalyst slurry.

[2] Masking Treatment of Phenolic Antioxidant

To 50 mL of toluene, 3 g of triisobutylaluminum and, as a phenolic antioxidant, 2 g of the above-described Compound No. 4 were added, and the resulting mixture was stirred for 2 hours at room temperature, to obtain a stabilizer solution containing a masked phenolic antioxidant.

[3] Polymerization of Olefin Monomers

In a 2000-mL pressure-resistant reactor wherein the atmosphere was replaced with nitrogen, 40 mg (0.35 mmol) of triethylaluminum, 0.25 mL of the stabilizer solution obtained by the masking treatment of a phenolic antioxidant in the above [2], 30 mg of a phosphorus-containing antioxidant: tris(2,4-di-tert-butylphenyl)phosphite, 7.08 mg (0.031 mmol) of dicyclopentyldimethoxysilane and the catalyst slurry prepared in the above [1] (0.021 mmol in terms of the titanium component) were placed, and the resulting mixture was stirred for 2 minutes.

After replacing the atmosphere in the pressure-resistant reactor with propylene, propylene was continuously introduced while hydrogen was kept at a hydrogen pressure of 0.2 bar G and propylene was kept to achieve a total pressure of 38.2 bar G, and prepolymerization was carried out at 25° C.

for 3 minutes. Thereafter, while the total pressure of propylene was maintained at 38.2 bar G, the temperature was increased to 70° C. and polymerization reaction was performed for 1 hour. After completion or the reaction, the polymer containing the solvent was transferred into a cylindrical container wherein the atmosphere had been replaced with nitrogen. The solvent was transferred to a flare line for solvent removal, to obtain the olefin polymer 4. The obtained olefin polymer was stored as it is under nitrogen atmosphere.

Example 4-1

The olefin polymer 4 obtained in the above Production Example 4 was subjected to granulation using a biaxial extruder (apparatus: PCM-30, manufactured by Ikegai Corp.; extrusion temperature, 230° C.; screw speed, 50 rpm). The granulation was carried out under nitrogen atmosphere until the olefin polymer 4 was fed into the biaxial extruder, and, under suction through vents in the vicinity of the head portion and in the vicinity of the central portion of the screw of the biaxial extruder, steam was injected into the barrel at a pressure of 15 kPa and a flow rate of 100 mL/min. between the feed inlet of the olefin polymer 4 and the vents, to obtain pellets.

Example 4-2

Example 4-2 was carried out in the same manner as Example 4-1 except that, instead of steam, a nitrogen gas having a moisture content of 0.1% in terms of the volume ratio with respect to nitrogen was introduced at a flow rate of 100 mL/min., to obtain pellets.

Comparative Example 4-1

Comparative Example 4-1 was carried out in the same manner as Example 4-1 except that the introduction of steam and the suction through vents were not carried out during granulation, to obtain pellets.

Production Example 5

Gas-Phase Polymerization

According to the following procedure ([1] preparation of a catalyst slurry, [2] masking treatment of a phenolic antioxidant, and [3] polymerization of olefin monomers), the olefin polymer 5 was obtained by gas-phase polymerization.
[1] Preparation of Catalyst Slurry
A catalyst slurry, which is a slurry of a 5 mg/mL solid titanium catalyst component in heptane, was prepared in the same manner as in [1] in the above Production Example 3.
[2] Masking Treatment of Phenolic Antioxidant
To 50 mL of heptane, 3 g of triethylaluminum and, as a phenolic antioxidant, 2 g of the above-described Compound No. 4 were added, and the resulting mixture was stirred for 2 hours, to obtain a stabilizer solution containing a masked phenolic antioxidant.
[3] Polymerization of Olefin Monomers (Gas-Phase Polymerization)
In a 1000-mL autoclave wherein the atmosphere was replaced with nitrogen, 400 mL of heptane was placed, and 148 mg (1.3 mmol) of triethylaluminum, 29.7 mg (0.13 mmol) of dicyclopentyldimethoxysilane, and the catalyst slurry prepared in the above [1] (0.0026 mmol in terms of the Ti component) were added thereto.

After replacing the atmosphere in the autoclave with propylene, a pressure of 1 kgf/cm$^2$ G was applied with propylene, and prepolymerization was carried out at 35° C. for 10 minutes. Thereafter, propylene was purged to decrease the pressure, and 150 mL of hydrogen (23° C.) was then introduced, followed by increasing the temperature to 60° C., supplying propylene into the autoclave such that a total pressure of 5 kgf/cm$^2$ G was maintained, increasing the temperature to 70° C. and performing polymerization for 1 hour. The obtained polymer was subjected twice to the following purification to obtain the olefin polymer 5.
(Purification Method)
After replacing the atmosphere in the autoclave with nitrogen, the polymer was left in the autoclave, while heptane as the supernatant fluid was decanted. Heptane contained in the polymer was evaporated by evacuating the autoclave, to dry the polymer. In the autoclave, 10 g of the dried polymer was left, and 44.5 mg (3.9 mmol) of triethylaluminum, 89 mg (0.39 mmol) of dicyclopentyldimethoxysilane, the catalyst slurry prepared in [1] (0.0078 mmol in terms of the titanium component), 0.25 ml of the stabilizer solution prepared in [2], and 30 mg of tris(2,4-di-tert-butylphenyl)phosphite as a phosphorus-containing antioxidant were added thereto.

After replacing the atmosphere in the autoclave with propylene, propylene was purged to decrease the pressure, and 150 mL of hydrogen (23° C.) was then introduced, followed by supplying propylene into the autoclave to maintain a total pressure of 5 kgf/cm$^2$ G and increasing the temperature to 70° C. to perform gas-phase polymerization for 1 hour, to purify the polymer 5 of interest.

Example 5-1

The olefin polymer 5 obtained in the above Production Example 5 was subjected to granulation using a biaxial extruder (apparatus: TEX-30a, manufactured by The Japan Steel Works, LTD.; extrusion temperature, 230° C.; screw speed, 100 rpm). The granulation was carried out under nitrogen atmosphere until the olefin polymer 5 was fed into the biaxial extruder, and, under suction through vents in the vicinity of the head portion and in the vicinity of the central portion of the screw of the biaxial extruder, steam was injected into the barrel at a pressure of 15 kPa and a flow rate of 100 mL/min. between the feed inlet of the olefin polymer 5 and the vents in the biaxial extruder, to obtain pellets.

Example 5-2

Example 5-2 was carried out in the same manner as Example 5-1 except that, instead of steam, a nitrogen gas having a moisture content of 0.1% in terms of the volume ratio with respect to nitrogen was introduced at a flow rate of 100 mL/min., to obtain pellets.

Comparative Example 5-1

Comparative Example 5-1 was carried out in the same manner as the above Example 5-1 except that the introduction of steam and the suction through vents were not carried out during granulation of the olefin polymer 5, to obtain pellets.
(Evaluation of Stabilization Effect)
Each of the pellets obtained in the Examples and Comparative Examples was subjected to granulation using a uniaxial extruder (apparatus: Plastomill μ, manufactured by Toyo Seiki Seisaku-sho, LTD.; extrusion temperature, 230° C.; screw speed, 50 rpm), and, based on the difference between the weight average molecular weights observed before and after the extrusion, the stabilization effect of the olefin polymer was evaluated.

The weight average molecular weights were measured by gel permeation chromatography (apparatus: GPC 2000, manufactured by Waters Corporation; columns: 2 columns of Styragel HT 6E and 1 column of Styragel HT2, manufactured by Waters Corporation; measurement temperature: 145° C.; solvent: o-dichlorobenzene; concentration: 4 mg/10 g).

The evaluation results are shown in Table 3 below.

TABLE 3

|  |  | Aftertreatment | | Evaluation of stabilization effect | |
| --- | --- | --- | --- | --- | --- |
|  | Method of production of olefin polymer | Steam injection upon granulation | Contacting with moisture-containing nitrogen upon granulation | Weight average molecular weight of olefin polymer, $Mw \times 10^5$ | |
|  |  |  |  | Before granulation | After granulation |
| Example 3-1 | Slurry polymerization | ○ | — | 4.03 | 4.06 |
| Example 3-2 | Slurry polymerization | — | ○ | 4.02 | 3.98 |
| Comparative Example 3-1 | Slurry polymerization | — | — | 4.10 | 3.60 |
| Example 4-1 | Bulk polymerization | ○ | — | 4.08 | 4.10 |
| Example 4-2 | Bulk polymerization | — | ○ | 4.11 | 4.03 |
| Comparative Example 4-1 | Bulk polymerization | — | — | 4.04 | 3.59 |
| Example 5-1 | Gas-phase polymerization | ○ | — | 3.87 | 3.82 |
| Example 5-2 | Gas-phase polymerization | — | ○ | 3.91 | 3.89 |
| Comparative Example 5-1 | Gas-phase polymerization | — | — | 3.76 | 3.17 |

As is evident from the results of Comparative Examples 3-1 to 5-1 in Table 3, a sufficient stabilization effect could not be obtained for the olefin polymers produced without using the method of the present invention, and their weight average molecular weights drastically decreased after the extrusion. In contrast, drastic decrease in the weight average molecular weight was not observed for the olefin polymers obtained by the production method of the present invention, and it was therefore confirmed that a sufficient stabilization effect was obtained by the production method of the present invention.

From the above results, it was confirmed that the effect of the present invention can be obtained, upon the granulation process of the olefin polymer in an extruder, by injection of steam, or a nitrogen gas containing moisture into the extruder.

(Preparation of Catalyst Slurry)

A homogeneous solution was prepared by mixing 4.76 g (50 mmol) of anhydrous magnesium chloride, 25 mL of decane and 23.4 mL (150 mmol) of 2-ethylhexyl alcohol together and allowing the reaction to proceed under heat at 130° C. for 2 hours. This was followed by addition of 1.11 g (7.5 mmol) of phthalic anhydride to the homogeneous solution and stirring the resulting mixture for 1 hour while maintaining a temperature of 130° C., to dissolve the phthalic anhydride in the homogeneous solution. Subsequently, the homogeneous solution was cooled to room temperature, and its total amount was fed dropwise to 200 mL (1.8 mol) of titanium tetrachloride kept at −20° C., for 1 hour. After completion of the feeding, the temperature was increased to 110° C. for 4 hours. When the temperature reached 110° C., 2.68 mL (12.5 mmol) of diisobutyl phthalate was added, and the resulting mixture was stirred for 2 hours while the temperature of 110° C. was maintained, to allow the reaction to proceed. After completion of the reaction, hot filtration was carried out to collect the residue, and the residue was resuspended in 200 mL of titanium tetrachloride, followed by heating the resulting suspension again to 110° C. and then allowing the reaction to proceed for 2 hours. After completion of the reaction, hot filtration was carried out again to collect the residue, and the residue was washed sufficiently with decane and hexane at 110° C. until free titanium compounds in the washing liquid became undetectable, to obtain a solid titanium catalyst component. An aliquot of the solid titanium catalyst component was dried and subjected to analysis of the catalyst composition, and, as a result, the composition was turned out to be 3.1% by weight titanium, 56.0% by weight chlorine, 17.0% by weight magnesium and 20.9% by weight isobutyl phthalate.

To the solid titanium catalyst component synthesized by the above production method, heptane was added such that a concentration of 5 mg/mL was achieved as a slurry in heptane, to prepare a catalyst slurry.

(Connection of Pipes)

In a production apparatus equipped with a supplying tank A for a slurry additive containing a phenolic antioxidant, a supplying tank B for triethylaluminum as a promoter and a polymerization tank C, a pipe 1 for transfer of triethylaluminum from the supplying tank B to the polymerization tank C was provided, and a pipe for transfer from the supplying tank A to the pipe 1 was connected to the pipe 1.

Olefin monomers were polymerized by the following methods.

Examples 6-1 to 6-5

In the supplying tank A, a slurry additive was prepared as described in Table 4 below.

To the supplying tank B, 33.3 mg (0.29 mmol) of triethylaluminum was supplied.

In the polymerization tank C, 29.7 mg (0.13 mmol) of dicyclopentyldimethoxysilane, 445 mg (3.9 mmol) of triethylaluminum and 0.0026 mmol of the catalyst slurry as a titanium component were placed.

Olefin monomers were polymerized as follows under the same conditions except for the type of the slurry additive supplied to the supplying tank.

(Polymerization Conditions)

At the same time as transfer of triethylaluminum from the supplying tank B to the polymerization tank C through the pipe 1, the slurry solution was transferred from the supplying tank A to the pipe 1, and triethylaluminum and the slurry additive were thereby mixed together in the pipe. The mixing in the pipe promptly caused the reaction to yield a homogeneous composition, and the resulting reaction product was supplied to the polymerization tank C. Immediately thereafter, the atmosphere in the polymerization tank C was replaced with propylene, and prepolymerization was carried out under a pressure of propylene of 1 kgf/cm$^2$ at 35° C. for 10 minutes. Thereafter, propylene was purged and 150 mL of hydrogen (23° C.) was introduced, followed by introducing propylene into the polymerization tank C to maintain a total pressure of 5 kgf/cm$^2$ G, increasing the temperature to 70° C. and performing polymerization for 1 hour. After replacing the atmosphere in the polymerization tank C with nitrogen, 5 mL of ethanol was added thereto at 40° C. to stop the polymerization, and the solvent was removed under reduced pressure at 50° C., followed by performing drying treatment at 40° C. for 5 hours while the vacuum state was maintained, to obtain an olefin polymer.

The composition of the slurry additive is shown in Table 4 below.

Comparative Example 6-1

In the supplying tank B for triethylaluminum, 10 mg of the above Compound No. 4 as a phenolic antioxidant, 30 mg of tris(2,4-di-tert-butylphenyl)phosphite as a phosphorus-containing antioxidant, 3.33 mg (0.029 mmol) of triethylaluminum and 60 mg of heptane were preliminarily mixed together to form a slurry. However, by leaving the mixture to stand in the tank for 24 hours, gel was generated throughout the tank.

(Composition of Slurry Additive)

In the above Comparative Example 6-1, preliminary mixing of an organoaluminum as a promoter with the phenolic antioxidant and leaving of the resulting mixture for 1 day caused gelation throughout the tank.

In the above Comparative Example 6-1, in order for the phenolic antioxidant masked by the promoter organoaluminum compound to be maintained as a homogeneous composition, equipment investment for providing a blending tank or the like is necessary. Further, since an organoaluminum compound is a compound which requires special care to secure safety of its storage, continuous maintenance is required for a long time.

Since, in some cases, polymerization of olefin monomers are continued for as long as several months, the tank for blending of a phenolic antioxidant and an organoaluminum compound needs to be provided in consideration of both safety and scaling-up, but this requires high equipment investment, which is industrially disadvantageous.

In contrast, in the production method of the present invention, stable polymerization of olefin monomers can be carried out with an existing polymerization apparatus by just introducing a slurry additive containing a phenolic antioxidant into a pipe through which a promoter organoaluminum compound is transferred to a polymerization tank, as can be confirmed from the results of Examples 6-1 to 6-5 in Table 4.

Example 7-1

According to the following procedure ([1] preparation of a catalyst slurry, [2] preparation of a phenoxide solution, [3] preparation of a phosphite solution, [4] polymerization of olefin monomers (propylene monomers), and [5] preparation of a fiber), a fiber was obtained.

[1] Preparation of Catalyst Slurry

A homogeneous solution was prepared by mixing 4.76 g (50 mmol) of anhydrous magnesium chloride, 25 mL of decane and 23.4 mL (150 mmol) of 2-ethylhexyl alcohol together and allowing the reaction to proceed under heat at 130° C. for 2 hours. This was followed by addition of 1.11 g (7.5 mmol) of phthalic anhydride to the homogeneous solution and stirring the resulting mixture for 1 hour while maintaining a temperature of 130° C., to dissolve the phthalic anhydride in the homogeneous solution. Subsequently, the

TABLE 4

| | Slurry additives | | | | Mixing | |
|---|---|---|---|---|---|---|
| | Phenolic antioxidant [1] | Phosphorus-containing antioxidant [2] | Neutralizer [3] | Solvent [4] | method for additives and promoter | Generation of gel |
| Example 6-1 | ○ | — | — | Heptane 60 mg | In pipe | No |
| Example 6-2 | ○ | ○ | — | Heptane 60 mg | In pipe | No |
| Example 6-3 | ○ | ○ | ○ | Heptane 120 mg | In pipe | No |
| Example 6-4 | ○ | ○ | — | Hexane 60 mg | In pipe | No |
| Example 6-5 | ○ | ○ | — | Cyclohexane 60 mg | In pipe | No |
| Comparative Example 6-1 | ○ | ○ | — | Heptane 60 mg | Preliminarily mixed in tank | Yes |

[1] Phenolic antioxidant: Compound No. 4 described above, 10 mg
[2] Phosphorus-containing antioxidant: tris(2,4-di-tert-butylphenyl)phosphite, 30 mg
[3] Neutralizer: calcium stearate, 50 mg
The additives [1] to [3] were mixed with the solvent to be made into a slurry additive.

homogeneous solution was cooled to room temperature, and its total amount was fed dropwise to 200 mL (1.8 mol) of titanium tetrachloride kept at −20° C., for 1 hour. After completion of the feeding, the temperature was increased to 110° C. for 4 hours. When the temperature reached 110° C., 2.68 mL (12.5 mmol) of diisobutyl phthalate was added, and the resulting mixture was stirred for 2 hours while the temperature of 110° C. was maintained, to allow the reaction to proceed. After completion of the reaction, hot filtration was carried out to collect the residue, and the residue was resuspended in 200 mL of titanium tetrachloride, followed by heating the resulting suspension again to 110° C. and then allowing the reaction to proceed for 2 hours. After completion of the reaction, hot filtration was carried out again to collect the residue, and the residue was washed sufficiently with decane and hexane at 110° C. until free titanium compounds in the washing liquid became undetectable, to obtain a solid titanium catalyst component. An aliquot of the solid titanium catalyst component was dried and subjected to analysis of the catalyst composition, and, as a result, the composition was turned out to be 3.1% by weight titanium, 56.0% by weight chlorine, 17.0% by weight magnesium and 20.9% by weight isobutyl phthalate.

To the solid titanium catalyst component synthesized by the above production method, heptane was added such that a concentration of 5 mg/mL was achieved as a slurry in heptane, to prepare a catalyst slurry.

[2] Preparation of Phenoxide Solution

In a flask wherein the atmosphere was replaced with nitrogen, 1.03 g (1.94 mmol) of 3-(3,5-di-tert-butyl-4-hydroxyphenyl)-N-octadecylpropionamide (the above Compound No. 4) and 65.5 mL of dry heptane were placed. With stirring, 3.0 mL (1 mol/L) of triethylaluminum solution in heptane was added dropwise thereto, to prepare a phenoxide solution.

[3] Preparation of Phosphite Solution

In a flask wherein the atmosphere was replaced with nitrogen, 0.9 g (1.4 mmol) of tris(2,4-di-tert-butylphenyl)phosphite and 30 mL of dry heptane were placed, to prepare a phosphite solution.

[4] Polymerization of Olefin Monomers (Propylene Monomers),

In an autoclave wherein the atmosphere was replaced with nitrogen, 600 mL of dry heptane and 2.2 mL (1 mol/L) of triethylaluminum solution in heptane were placed. This was followed by sequential addition thereto of 1.4 mL of the phenoxide solution prepared in the above [2], 0.7 mL of the phosphite solution prepared in the above [3], 4.1 mL of a heptane solution prepared by dissolving 1.2 g (5.3 mmol) of dicyclopentyldimethoxysilane in 100 mL of dry heptane, and 4.0 mL of the catalyst slurry prepared in the above [1].

The atmosphere in the autoclave was replaced with propylene, and hydrogen (7.0 L; in terms of the volume in the standard state) was fed thereto, followed by performing prepolymerization (600 rpm) at a propylene pressure of 1 kgf/cm² G at 50° C. for 5 minutes. Thereafter, polymerization reaction was carried out at a propylene pressure of 6 kgf/cm² at 70° C. for 1 hour. After purging the gas, 5 mL of ethanol was added to the reaction liquid, and the resulting mixture was stirred for 5 minutes to stop the polymerization reaction, followed by removing the solvent under reduced pressure and drying the resultant under vacuum at 40° C. for 10 hours, to obtain a polypropylene powder prepared by polymerizing propylene monomers.

[5] Preparation of Fiber

To 100 parts by mass of the obtained polypropylene powder, 0.05 part by mass of calcium stearate was added, and these were mixed together, followed by being subjected to granulation using a uniaxial extruder (apparatus: Plastomill μ, manufactured by Toyo Seiki Seisaku-sho, LTD.; extrusion temperature, 230° C.; screw speed, 50 rpm), to obtain pellets. The pellets were supplied to a spinning machine (30-mm diameter, manufactured by Shimadzu Corporation) and extruded into nozzles (0.45-mm diameter, 230° C., 30 holes). A fiber was then collected at a winding rate of 1000 m/min. The obtained fiber was composed of 30 bundled 6.8-denier filaments. Further, a sheet was prepared by pressing the pellets at 230° C. at a load of 120 kgf/cm² for 5 minutes. The thickness of the sheet after the pressing was 2 mm.

Example 7-2

A fiber and a sheet were prepared in the same manner as in [3] Preparation of Phosphite Solution in the above Example 7-1 except that 0.82 g (1.4 mmol) of 2,2'-methylenebis(4,6-di-tert-butylphenyl)-octadecylphosphite was used instead of 0.90 g (1.4 mmol) of tris(2,4-di-tert-butylphenyl)phosphite.

Comparative Example 7-1

A propylene polymer was obtained in the same manner as in [4] Polymerization of Olefin Monomers in the above Example 7-1 except that 1.4 mL of the phenoxide solution and 0.7 mL of the phosphite solution were not used.

With 100 parts by mass of the obtained propylene polymer, 0.05 part by mass each of tetrakis[3-(3,5-di-tert-butyl-4-hydroxyphenyl)propionyloxymethyl]methane, tris(2,4-di-tert-butylphenyl)phosphite and calcium stearate was mixed, and the resulting mixture was subjected to granulation using a uniaxial extruder (apparatus: Plastomill μ, manufactured by Toyo Seiki Seisaku-sho, LTD.; extrusion temperature, 230° C.; screw speed, 50 rpm), to obtain pellets. The pellets were supplied to a spinning machine (30-mm diameter, manufactured by Shimadzu Corporation) and extruded into nozzles (0.45-mm diameter, 230° C., 30 holes). A fiber was then collected at a winding rate of 1000 m/min. The obtained fiber was composed of 30 bundled 6.8-denier filaments. Further, a sheet was prepared by pressing the pellets at 230° C. at a load of 120 kgf/cm² for 5 minutes. The thickness of the sheet after the pressing was 2 mm.

Comparative Example 7-2

A propylene polymer was obtained in the same manner as in [4] Polymerization of Olefin Monomers in the above Example 7-1 except that 1.4 mL of the phenoxide solution and 0.7 mL of the phosphite solution were not used. To 100 parts by mass of the obtained propylene polymer, 0.01 part by mass each of 1,3,5-tris(3-hydroxy-4-tert-butyl-2,6-dimethylbenzyl)isocyanurate and 2,2'-methylenebis(4,6-di-tert-butylphenyl)-octadecylphosphite, and 0.05 part by mass of calcium stearate were added, and the resulting mixture was mixed well, followed by being subjected to granulation using a uniaxial extruder (apparatus: Plastomill μ, manufactured by Toyo Seiki Seisaku-sho, LTD.; extrusion temperature, 230° C.; screw speed, 50 rpm), to obtain pellets. The pellets were supplied to a spinning machine (30-mm diameter, manufactured by Shimadzu Corporation) and extruded into nozzles (0.45-mm diameter, 230° C., 30 holes). A fiber was then collected at a winding rate of 1000 m/min. The obtained fiber was composed of 30 bundled 6.8-denier filaments. Further, a sheet was prepared by pressing the pellets at 230° C. at a load of 120 kgf/cm² for 5 minutes. The thickness of the sheet after the pressing was 2 mm.

Comparative Example 7-3

A fiber and a sheet were produced in the same manner as in [4] Polymerization of Olefin Monomers in the above Example 7-1 except that 2.8 mL, instead of 1.4 mL, of the phenoxide solution was used and 0.7 mL of the phosphite solution was not used.

Comparative Example 7-4

A fiber and a sheet were produced in the same manner as in [4] Polymerization of Olefin Monomers in the above Example 7-1 except that 1.4 mL, instead of 0.7 mL, of the phenoxide solution was used and 1.4 mL of the phenoxide solution was not used.

Comparative Example 7-5

A propylene polymer was obtained in the same manner as in [4] Polymerization of Olefin Monomers in the above Example 7-1 except that 1.4 mL of the phenoxide solution and 0.7 mL of the phosphite solution were not used. To 100 parts by mass of the obtained propylene polymer, 0.01 part by mass each of Compound No. 4 and tris(2,4-di-tert-butylphenyl)phosphite, and 0.05 part by mass of calcium stearate were added, and the resulting mixture was mixed well, followed by being subjected to granulation using a uniaxial extruder (apparatus: Plastomill μ, manufactured by Toyo Seiki Seisaku-sho, LTD.; extrusion temperature, 230° C.; screw speed, 50 rpm), to obtain pellets. The pellets were supplied to a spinning machine (30-mm diameter, manufactured by Shimadzu Corporation) and extruded into nozzles (0.45-mm diameter, 230° C., 30 holes). A fiber was then collected at a winding rate of 1000 m/min. The obtained fiber was composed of 30 bundled 6.8-denier filaments. Further, a sheet was prepared by pressing the pellets at 230° C. at a load of 120 kgf/cm$^2$ for 5 minutes. The thickness of the sheet after the pressing was 2 mm.

Comparative Example 7-6

A propylene polymer was obtained in the same manner as in [4] Polymerization of Olefin Monomers in the above Example 7-1 except that 1.4 mL of the phenoxide solution was not used. To 100 parts by mass of the obtained propylene polymer, 0.01 part by mass of the above Compound No. 4 and 0.05 part by mass of calcium stearate were added, and the resulting mixture was mixed well, followed by being subjected to granulation using a uniaxial extruder (apparatus: Plastomill μ, manufactured by Toyo Seiki Seisaku-sho, LTD.; extrusion temperature, 230° C.; screw speed, 50 rpm), to obtain pellets. The pellets were supplied to a spinning machine (30-mm diameter, manufactured by Shimadzu Corporation) and extruded into nozzles (0.45-mm diameter, 230° C., 30 holes). A fiber was then collected at a winding rate of 1000 m/min. The obtained fiber was composed of 30 bundled 6.8-denier filaments. Further, a sheet was prepared by pressing the pellets at 230° C. at a load of 120 kgf/cm$^2$ for 5 minutes. The thickness of the sheet after the pressing was 2 mm.

Comparative Example 7-7

A propylene polymer was obtained in the same manner as in [4] Polymerization of Olefin Monomers in the above Example 7-1 except that 0.7 mL of the phosphite solution was not used. To 100 parts by mass of the obtained propylene polymer, 0.01 part by mass of tris(2,4-di-tert-butylphenyl)phosphite and 0.05 part by mass of calcium stearate were added, and the resulting mixture was mixed well, followed by being subjected to granulation using a uniaxial extruder (apparatus: Plastomill μ, manufactured by Toyo Seiki Seisaku-sho, LTD.; extrusion temperature, 230° C.; screw speed, 50 rpm), to obtain pellets. The pellets were supplied to a spinning machine (30-mm diameter, manufactured by Shimadzu Corporation) and extruded into nozzles (0.45-mm diameter, 230° C., 30 holes). A fiber was then collected at a winding rate of 1000 m/min. The obtained fiber was composed of 30 bundled 6.8-denier filaments. Further, a sheet was prepared by pressing the pellets at 230° C. at a load of 120 kgf/cm$^2$ for 5 minutes. The thickness of the sheet after the pressing was 2 mm.

The fibers obtained in the above Examples 7-1 and 7-2, and Comparative Examples 7-1 to 7-7 were subjected to the following evaluation of the stability. The respective results are shown in Table 5. In Table 5, the value shown below each compound name in the columns listing stabilizers represents the ratio of each stabilizer excluding the additive component, with respect to 100 parts by mass of the propylene polymer. Further, the sheets obtained in the above Examples 7-1 and 7-2, and Comparative Examples 7-1 to 7-7 were subjected to evaluation by a NOx gas color change test.

(NOx Gas Color Change Test)

A NOx gas color change test was carried out by the following procedure. The results are shown in Table 5 below.

A sheet was suspended on a glass rod and placed in a glass desiccator.

In a glass beaker, 9.52 g of 85% phosphoric acid was dissolved in 38.10 g of distilled water to prepare an aqueous phosphoric acid solution, and the beaker was placed in the glass desiccator.

In another glass beaker, 0.786 g of 97% sodium nitrate was dissolved in 9.52 g of distilled water to prepare an aqueous sodium nitrate solution.

The aqueous sodium nitrate solution was added to the aqueous phosphoric acid solution in the glass desiccator at once, and the desiccator was immediately closed with a lid, to allow generation of 2% NOx gas.

The joint portion between the body and the lid of the glass desiccator was sealed with Valqua tape, and vinyl tape was further attached thereto, to prevent gas leakage.

The glass desiccator was placed in a Geer oven at 40° C. and left to stand for 140 hours.

Thereafter, the yellowness index (YI) of the sheet was measured, to determine the yellowness index for the sheet before the exposure to the NOx gas (initial Y. I.) and the yellowness index after the exposure test (ΔYI).

(Stability)

The fiber was left to stand at 120° C. in an oven for 15 hours, and drawn by a tensile tester at a rate of 10 mm/min.

In the evaluation results, the symbols ○, Δ, and X indicate degrees of elongation of more than 200%, not less than 150% and not more than 200%, and less than 150%, respectively.

TABLE 5

| | Stabilizer | | | | Evaluation | | |
| --- | --- | --- | --- | --- | --- | --- | --- |
| | Phenolic antioxidant | Method of addition [5] | Phosphorus-containing antioxidant | Method of addition [5] | Initial Y.I. | ΔY.I. | Stability [6] |
| Example 7-1 | Compound No. 4 0.01 part by mass | A | Compound 1 [1] 0.01 part by mass | A | 1.2 | 4.3 | ○ |
| Example 7-2 | Compound No. 4 0.01 part by mass | A | Compound 2 [2] 0.01 part by mass | A | 1.0 | 4.0 | ○ |
| Comparative Example 7-1 | Comparative Compound 1 [3] | B | Compound 1 [1] 0.05 part by mass | B | 2.1 | 9.0 | ○ |
| Comparative Example 7-2 | Comparative Compound 2 [4] | B | Compound 2 [2] 0.01 part by mass | B | 3.0 | 7.2 | X |
| Comparative Example 7-3 | Compound No. 4 0.02 part by mass | A | — | — | 1.4 | 5.4 | ○ |
| Comparative Example 7-4 | — | — | Compound 1 [1] 0.02 part by mass | A | 0.8 | 2.6 | X |
| Comparative Example 7-5 | Compound No. 4 0.01 part by mass | B | Compound 1 [1] 0.01 part by mass | B | 2.7 | 6.7 | X |
| Comparative Example 7-6 | Compound No. 4 0.01 part by mass | B | Compound 1 [1] 0.01 part by mass | A | 1.7 | 5.2 | X |
| Comparative Example 7-7 | Compound No. 4 0.01 part by mass | A | Compound 1 [1] 0.01 part by mass | B | 1.9 | 5.6 | Δ |

[1] Compound 1: tris(2,4-di-tert-butylphenyl)phosphite
[2] Compound 2: 2,2'-methylenebis(4,6-di-tert-butylphenyl)-octadecyl phosphite
[3] Comparative Compound 1: tetrakis[3-(3,5-di-tert-butyl-4-hydroxyphenyl)propionyloxymethyl]methane
[4] Comparative Compound 2: 1,3,5-tris(3-hydroxy-4-tert-butyl-2,6-dimethylbenzyl)isocyanurate
[5] Method of addition
A: A stabilizer was added upon polymerization of olefin monomers, and calcium stearate was then added, followed by granulation with an extruder at an extrusion temperature of 230° C.
B: After polymerization of olefin monomers, a stabilizer and calcium stearate were added to the resulting polymer, followed by mixing of the resulting mixture and granulation using an extruder at an extrusion temperature of 230° C.
[6] Stability: After leaving the fiber to stand at 120° C. in an oven for 15 hours, the fiber was subjected to a tensile test.

In Comparative Examples 7-1 and 7-2 and Comparative Examples 7-5 to 7-7, wherein a stabilizer(s) was/were added after polymerization of olefin monomers and granulation was then performed, the initial yellowness index (Y. I.) was high. Increase in yellowness was especially large in Comparative Example 7-1 compared to the fibers of the present invention in Examples 7-1 and 7-2 in spite of the fact that a 5 times larger amount of a commonly used stabilizer was blended in Comparative Example 7-1. Thus, the fiber in Comparative Example 7-1 was more likely to be affected by a NOx gas, and the effect of addition of the stabilizers was poor in this fiber.

Further, although other types of a phenolic antioxidant and a phosphorus-containing antioxidant were used in Comparative Example 7-2, the stabilization effect was poor again in this fiber compared to the fibers of the present invention.

Further, in Comparative Examples 7-3 and 7-4, certain degrees of the effect of suppression of the initial yellowness were observed in the cases where a phenolic antioxidant or a phosphorus-containing antioxidant was added alone upon polymerization of olefin monomers. However, in the case of Comparative Example 7-3, wherein a phenolic antioxidant was added alone, the fiber was likely to be affected by a NOx gas, and, in the case of Comparative Example 7-4, wherein a phosphorus-containing antioxidant was added alone, the obtained fiber itself lacked stability and the fiber was likely to be broken although the fiber was not likely to be affected by a NOx gas.

In contrast, as is evident from Examples 7-1 and 7-2, the olefin powders of the present invention were not likely to be affected by a NOx gas, and the obtained fibers had excellent stability.

From the above results, it could be confirmed that, by adding a combination of a specific phenolic antioxidant, which was masked by an organoaluminum compound, and a phosphorus-containing antioxidant before or during polymerization of olefin monomers, the influence of a NOx gas can be suppressed and a fiber showing lower yellowness can be obtained.

The invention claimed is:

1. A method for recycling a phenolic antioxidant from a phenolic antioxidant masked with an organoaluminum compound and contained in an olefin polymer, wherein the phenolic antioxidant is represented by Formula (1) below:

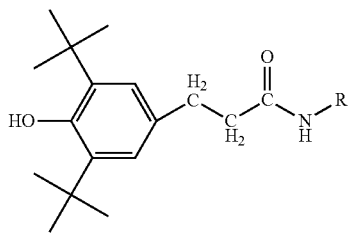
(1)

(wherein R represents $C_{12}$-$C_{24}$ alkyl which is optionally branched, $C_3$-$C_{12}$ cycloalkyl which is optionally substituted, or $C_6$-$C_{18}$ aryl which optionally has a substituent(s)); which comprises contacting said olefin polymer with nitrogen gas comprising water and/or a proton donor at a volume ratio of $1.0 \times 10^{-6}$ to $2.5 \times 10^{-2}$ with respect to 1 volume of nitrogen.

2. The method for recycling a phenolic antioxidant according to claim 1, wherein said organoaluminum compound is a trialkyl aluminum.

3. The method for recycling a phenolic antioxidant according to claim 1, wherein the polymerization method to obtain said olefin polymer is gas-phase polymerization or bulk polymerization, or the combination of these methods.

4. The method for recycling a phenolic antioxidant according to claim 1, wherein said proton donor is methanol or ethanol.

5. The method for recycling a phenolic antioxidant according to claim 1, wherein contacting said olefin polymer with nitrogen gas occurs in a cylindrical column by supplying said olefin polymer from the upside of the column and supplying said nitrogen gas from the bottom of the column, intermittently or continuously.

6. The method for recycling a phenolic antioxidant according to claim 1, wherein contacting said olefin polymer with said nitrogen gas by supplying said olefin polymer from the upper part of a tank and supplying said nitrogen gas from the lower part of the tank, intermittently or continuously.

* * * * *